United States Patent
Taira et al.

(10) Patent No.: US 8,068,096 B2
(45) Date of Patent: Nov. 29, 2011

(54) GAME PROGRAM AND GAME SYSTEM

(75) Inventors: Masayuki Taira, Kyoto (JP); Goro Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1159 days.

(21) Appl. No.: 11/488,135

(22) Filed: Jul. 18, 2006

(65) Prior Publication Data

US 2007/0257884 A1    Nov. 8, 2007

(30) Foreign Application Priority Data

May 8, 2006   (JP) .................................. 2006-129230

(51) Int. Cl.
G06F 3/33   (2006.01)
(52) U.S. Cl. ......................... 345/158; 345/159; 345/162
(58) Field of Classification Search .................. 345/162, 345/179, 204, 522, 530, 156–159; 178/19.04, 178/19.01; 463/1, 7, 11, 31, 37, 39, 43, 36; 341/20; 702/142, 127
See application file for complete search history.

(56) References Cited

U.S. PATENT DOCUMENTS

| | | | | |
|---|---|---|---|---|
| 4,839,838 A * | 6/1989 | LaBiche et al. | ............... | 708/141 |
| 5,926,780 A * | 7/1999 | Fox et al. | ...................... | 702/142 |
| 6,229,102 B1 * | 5/2001 | Sato et al. | .................. | 178/19.01 |
| 6,287,198 B1 * | 9/2001 | McCauley | ....................... | 463/37 |
| 6,929,543 B1 * | 8/2005 | Ueshima et al. | .................. | 463/7 |
| 7,663,509 B2 * | 2/2010 | Shen | .............................. | 341/20 |
| 7,737,944 B2 * | 6/2010 | Harrison et al. | .............. | 345/156 |
| 7,774,155 B2 * | 8/2010 | Sato et al. | ...................... | 702/127 |
| 7,775,882 B2 * | 8/2010 | Kawamura et al. | ............. | 463/32 |
| 7,782,297 B2 * | 8/2010 | Zalewski et al. | .............. | 345/156 |
| 2003/0057808 A1 * | 3/2003 | Lee et al. | ....................... | 310/339 |
| 2003/0222851 A1 * | 12/2003 | Lai et al. | ....................... | 345/163 |
| 2004/0017355 A1 * | 1/2004 | Shim | .............................. | 345/157 |
| 2004/0147317 A1 * | 7/2004 | Ito et al. | ........................... | 463/36 |
| 2004/0252109 A1 * | 12/2004 | Trent et al. | ..................... | 345/174 |
| 2005/0070359 A1 * | 3/2005 | Rodriquez et al. | ............. | 463/42 |
| 2005/0134555 A1 * | 6/2005 | Liao | .............................. | 345/156 |
| 2006/0015287 A1 * | 1/2006 | Vock et al. | ..................... | 702/141 |
| 2006/0094502 A1 * | 5/2006 | Katayama et al. | .............. | 463/31 |
| 2006/0123146 A1 * | 6/2006 | Wu et al. | ........................... | 710/8 |
| 2006/0231794 A1 * | 10/2006 | Sakaguchi et al. | ....... | 252/299.61 |

(Continued)

FOREIGN PATENT DOCUMENTS

JP    2001-104643    4/2001

OTHER PUBLICATIONS

A. Fujii et al.; Pointing device for notebook computer; Nov. 2, 2001; Pub. No. JP 2001306245 A.*

*Primary Examiner* — Prabodh M Dharia
(74) *Attorney, Agent, or Firm* — Nixon & Vanderhye P.C.

(57) ABSTRACT

A game system comprises a pointing device for pointing to an arbitrary point in a game screen displayed on a display device and an acceleration sensor provided in the pointing device. A processor of the game system repeatedly identifies a position of the point pointed to by the pointing device to detect a change in the identified position. Also, the processor determines a movement direction of the pointing device based on an acceleration detected by an acceleration sensor. When detecting a position change, the processor executes game processing based on the position change, and when detecting no position change, the processor executes game processing based on the determined movement direction of the pointing device.

20 Claims, 18 Drawing Sheets

U.S. PATENT DOCUMENTS

2006/0252477 A1* 11/2006 Zalewski et al. .................. 463/7
2006/0282873 A1* 12/2006 Zalewski et al. .............. 725/133
2007/0015588 A1* 1/2007 Matsumoto et al. ............ 463/43
2007/0064004 A1* 3/2007 Bonner et al. ................ 345/442
2007/0159362 A1* 7/2007 Shen ............................... 341/20
2007/0208520 A1* 9/2007 Zhang et al. .................... 702/58
2007/0265075 A1* 11/2007 Zalewski ........................ 463/36
2007/0265088 A1* 11/2007 Nakada et al. .................. 463/37

* cited by examiner

FIG. 9
(A)
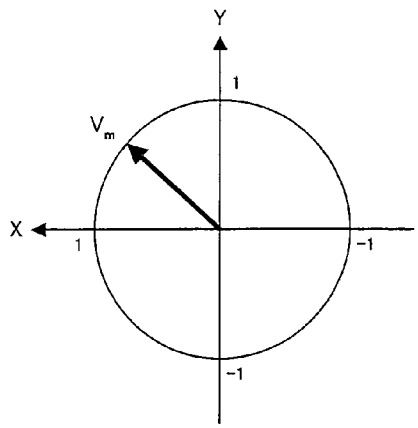
(B)
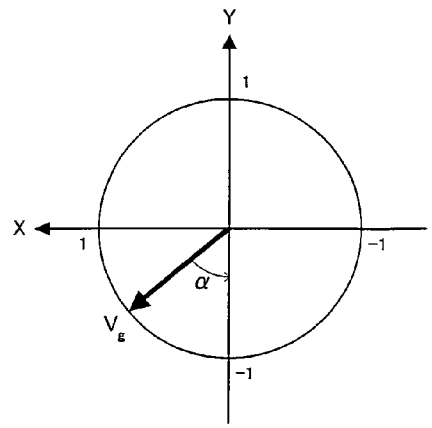
(C)
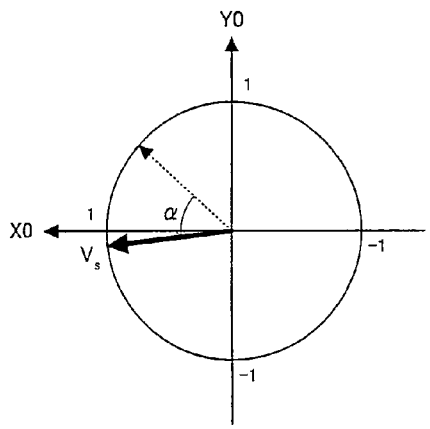
FIG. 10
(A)
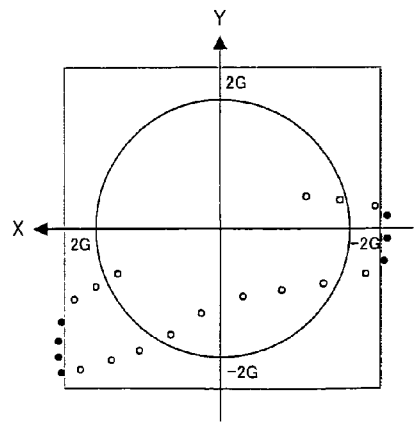
(B)
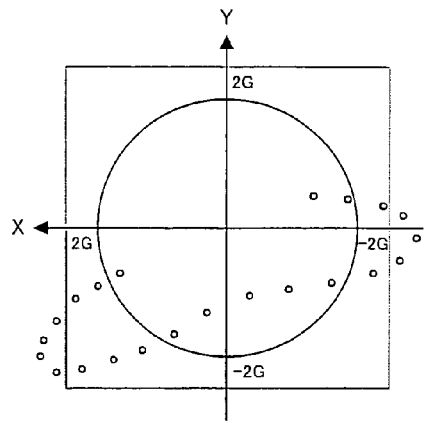

FIG. 11
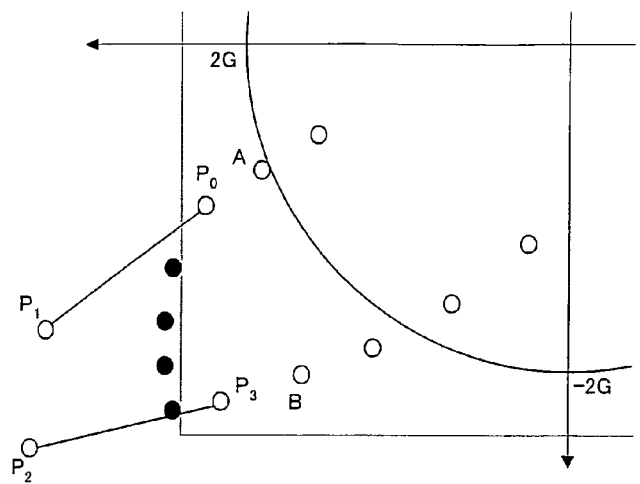
FIG. 12
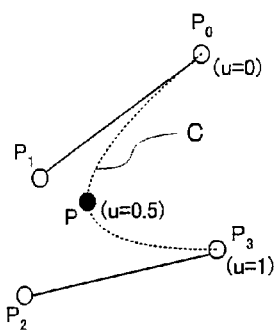
FIG. 13
(A)
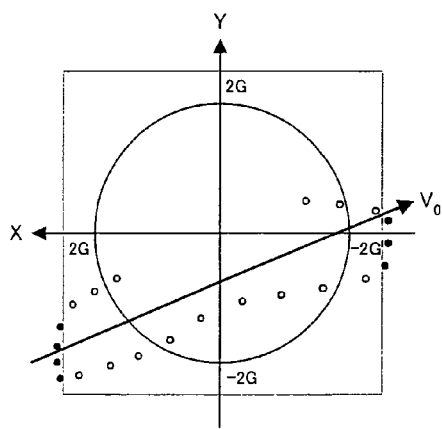
(B)
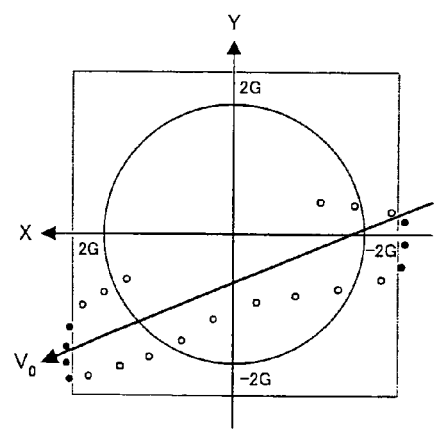

GAME PROGRAM AND GAME SYSTEM

CROSS REFERENCE TO RELATED APPLICATION

The disclosure of Japanese Patent Application No. 2006-129230 is incorporated herein by reference.

TECHNICAL FIELD

The exemplary embodiments disclosed herein relate to a game program and a game system. More specifically, the exemplary embodiments disclosed herein relate to a game program and a game system that utilize an optical pointing device and an acceleration sensor.

BACKGROUND AND SUMMARY

There is known this conventional kind of system disclosed in Japanese Patent Application Laying-open No. 2001-104643. This related art comprises a gun-type controller provided with a light-receiving sensor and an inclination sensor (pointing device) and a display. The light-receiving sensor detects the amount of light by raster-scanning on the display and determines the shooting position based on the result of detection. Additionally, the inclination sensor detects the inclination of the gun-type controller, and switches between offensive mode and defensive mode based on the result of detection.

In the related art, however, the inclination sensor (acceleration sensor) is merely used for mode switching that has nothing to do with a pointing operation. Thus, in such a situation where the light-receiving sensor cannot detect a light source (marker) such as a scanning line, it is impossible to identify the position pointed to by the pointing device, which may interrupt the progress of the game.

Therefore, it is a feature of certain exemplary embodiments to provide a novel game program and game system.

It is another feature of certain exemplary embodiments to provide a game program and game system that make game processing proceed even if it is difficult to identify a position of a point pointed to by a pointing device.

A game program according to the certain exemplary embodiments allows a processor of a game system (10) to execute a position identification step (S35), a position change detection step (S41, S43, S93), a first direction determination step (S97) and a game processing step (S25). The game system comprises a display device (34) for displaying a game screen updated according to progress of game processing, a pointing device (26) for pointing to an arbitrary point in the game screen displayed by the display device, and an acceleration sensor (68) provided in the pointing device.

In the position identification step, a position of the point pointed to by the pointing device is identified at intervals of unit of time. In the position change detection step, a change in the position identified in the position identification step is detected. In the first direction determination step, a movement direction of the pointing device is determined on the basis of the acceleration detected by the acceleration sensor. In the game processing step, the game processing is executed on the basis of a position change when the position change is detected in the position change detection step, or executed on the basis of the movement direction determined in the first direction determination step when no position change is detected in the position change detection step.

According certain exemplary embodiments, when a change in the position of a point pointed to by the pointing device, the game processing is carried out on the basis of the position change, and when no position change is detected, the game processing is carried out on the basis of the movement direction determined from the result of detection by the acceleration sensor, which makes it possible to advance the game processing smoothly with the use of the movement direction of the pointing device even if it is impossible to identify the position of the point pointed to by the pointing device. The movement direction includes at least one of the speed direction and the acceleration direction.

A game program according to certain exemplary embodiments allows the processor to further execute an acceleration determination step (S5). In the acceleration determination step, it is determined whether or not the acceleration detected by the acceleration sensor is equal to or more than a threshold value. In the position identification step, position identification is carried out only for a time period during when it is determined in the acceleration determination step that the acceleration is equal to or more than the threshold value.

According to certain exemplary embodiments, position identification can be performed with a high degree of efficiency. It is also possible to prevent the game processing from being advanced by the player's unintentional moving the pointing device due to hand shake, etc.

A game program according to certain exemplary embodiments allows the processor to further execute a second direction determination step (S95). In the second direction determination step, the movement direction of the pointing device is determined based on, out of a plurality of positions detected within the time period in the position identification step, a first detected position and a last detected position.

According to certain exemplary embodiments, the movement direction can be determined with ease and accuracy.

In a game program according to certain exemplary embodiments, in the first direction determination step, direction determination is carried out only for the time period.

According to certain exemplary embodiments, the determination of the movement direction can be carried out with efficiency. It is also possible to prevent the game processing from being wrongly advanced due to the player's unintentional movement.

The game processing according to certain exemplary embodiments includes a process of deciding a path in the game screen corresponding to the movement of the pointing device. In the game processing step, when a position change is detected in the position change detection step, the path is decided on the basis of a plurality of positions identified in the position identification step, and when no position change is detected in the position change detection step, the path is decided on the basis of the movement direction determined in the first direction determination step and a preset position.

According to certain exemplary embodiments, it is possible to decide a path based on the determined movement direction even if no position change is detected. In addition, if a position change is detected, it is possible to decide the path with accuracy based on the plurality of identified positions, preferably based on the two positions, the first and last ones out of the plurality of identified positions.

A game program according to certain exemplary embodiments allows the processor to further execute a first direction calculation step (S17), a second direction calculation step (S19), and a third direction calculation step (S21). In the first direction calculation step, a speed direction of the pointing device in a local coordinate system moving together with the pointing device is calculated by accumulatively adding a change in acceleration detected by the acceleration sensor. In the second direction calculation step, a gravity direction in the local coordinate system is calculated by accumulatively adding an acceleration detected by the acceleration sensor.

In the third direction calculation step, a speed direction in a stationary coordinate system is calculated by subjecting the speed direction calculated in the first direction calculation step to a rotational operation so that the gravity direction calculated in the second direction calculation step matches a gravity direction in the stationary coordinate system. The determination in the first direction determination step is made on the basis of a result of calculation in the third direction calculation step, that is, on the basis of the speed direction in the stationary coordinate system.

According to certain exemplary embodiments, it is possible to carry out the game processing accurately with the use of the speed direction in the stationary coordinate system.

The acceleration sensor according to certain exemplary embodiments detects acceleration components in three directions. In each of the first direction calculation step, the second direction calculation step and the third direction calculation step, calculation is carried out on two acceleration components corresponding to any two of the three directions. In the acceleration determination step, determination is carried out on the remaining one of the three directions.

According to the certain exemplary embodiments, the calculations in the first to third direction calculation steps are performed only on the acceleration components in the two directions, resulting in a decrease in processing load. The determination in the acceleration determination step is carried out on the acceleration component in the remaining one direction, which allows the game to be advanced accurately and efficiently by means of the single three-direction acceleration sensor.

A game program according to certain exemplary embodiments allows the processor to include a correction step (S15). The acceleration sensor has a predetermined detectable range. In the correction step, when the acceleration of the pointing device exceeds the detectable range, the acceleration detected by the acceleration sensor is corrected.

According to certain exemplary embodiments, when the acceleration of the pointing device exceeds the detectable range of the acceleration sensor, the detected acceleration is corrected in the correction step.

In the correction step of certain exemplary embodiments, correction is made with use of Bazier curve (C) defined by the acceleration detected by the acceleration sensor when the acceleration of the pointing device falls within the detectable range.

According to certain exemplary embodiments, the accuracy of direction determination is increased, making it possible to accommodate even a movement exceeding the detectable range of the acceleration sensor.

A game program according to certain exemplary embodiments allows the processor to further execute a gravity direction calculation step (S165 to S177) and an acceleration direction calculation step (S105). In the gravity direction calculation step, an acceleration detected by the acceleration sensor is accumulatively added, whereby a gravity direction in a local coordinate system moving together with the pointing device is determined. In the acceleration direction calculation step, the acceleration detected by the acceleration sensor is subjected to a rotational process so that the gravity direction in the stationary coordinate system matches the gravity direction calculated in the gravity direction calculation step, whereby a direction of acceleration in a stationary coordinate system is calculated is determined. The determination in the first direction determination step is made on the basis of a result of calculation in the acceleration direction calculation step, that is, on the basis of the direction of the acceleration in the stationary coordinate system.

According to certain exemplary embodiments, it is possible to carry out the game processing with accuracy by using the acceleration direction in the stationary coordinate system, regardless of the position of the pointing device.

The acceleration sensor according to certain exemplary embodiments detects acceleration components in three directions. In each of the direction calculation step and the acceleration calculation step, calculation is carried out on three acceleration components corresponding to the three directions.

According to certain exemplary embodiments, the calculated acceleration can be reflected on a three-dimensional game screen. It is also possible to make the game using the acceleration progress with accuracy even on a two-dimensional game screen.

A game program according to certain exemplary embodiments further comprises a plurality of light-emitting elements (24a, 24b) provided in proximity to a screen of the display device. The optical pointing device includes an imaging unit (72) for imaging an object scene containing the plurality of light-emitting elements. In the position identification step, the position pointed to by the pointing device is identified on the basis of an image of the object scene imaged by the imaging unit.

A game system according to certain exemplary embodiments comprises a display device (34) for displaying a game screen updated according to progress of game processing, a pointing device (26) for pointing to an arbitrary point in the game screen displayed by the display device, an acceleration sensor (68) provided in the pointing device, a position identification means (S35) for identifying a position of the point pointed to by the pointing device at intervals of unit of time, a position change detection means (S41, S43, S93) for detecting a change in the position identified by the position identification means, a first direction determination means (S97) for determining a movement direction of the pointing device, based on the acceleration detected by the acceleration sensor, and a game processing means (S25) for executing the game processing based on a position change when the position change is detected by the position change detection means, or executing the game processing based on the movement direction determined by the first direction determination means when no position change is detected by the position change detection means.

According to certain exemplary embodiments, it is possible to make the game processing advance smoothly using the movement direction of the pointing device even if it is impossible to identify the position of the point pointed to by the pointing device.

According to certain exemplary embodiments, the game processing can be advanced smoothly even if it is impossible to identify the position of the point pointed to by the pointing device.

The above described features, aspects and advantages of the certain exemplary embodiments described herein will become more apparent from the following detailed description when taken in conjunction with the accompanying drawings.

BRIEF DESCRIPTION OF THE DRAWINGS

FIG. 9 (A) to FIG. 9 (C) are illustrative views showing ways to decide a direction of cutting, which is applied to FIG. 1 exemplary embodiment;

FIG. 10 (A) and FIG. 10 (B) are illustrative views showing ways to correct an acceleration, which is applied to FIG. 1 exemplary embodiment;

FIG. 11 is an illustrative view describing in detail the ways shown in FIG. 10 (A) and FIG. 10 (B);

FIG. 12 is an illustrative view describing in detail the ways shown in FIG. 10 (A) and FIG. 10 (B);

FIG. 13 (A) and FIG. 13 (B) are illustrative views describing in detail the ways shown in FIG. 10 (A) and FIG. 10 (B);

DETAILED DESCRIPTION

Figure 1:
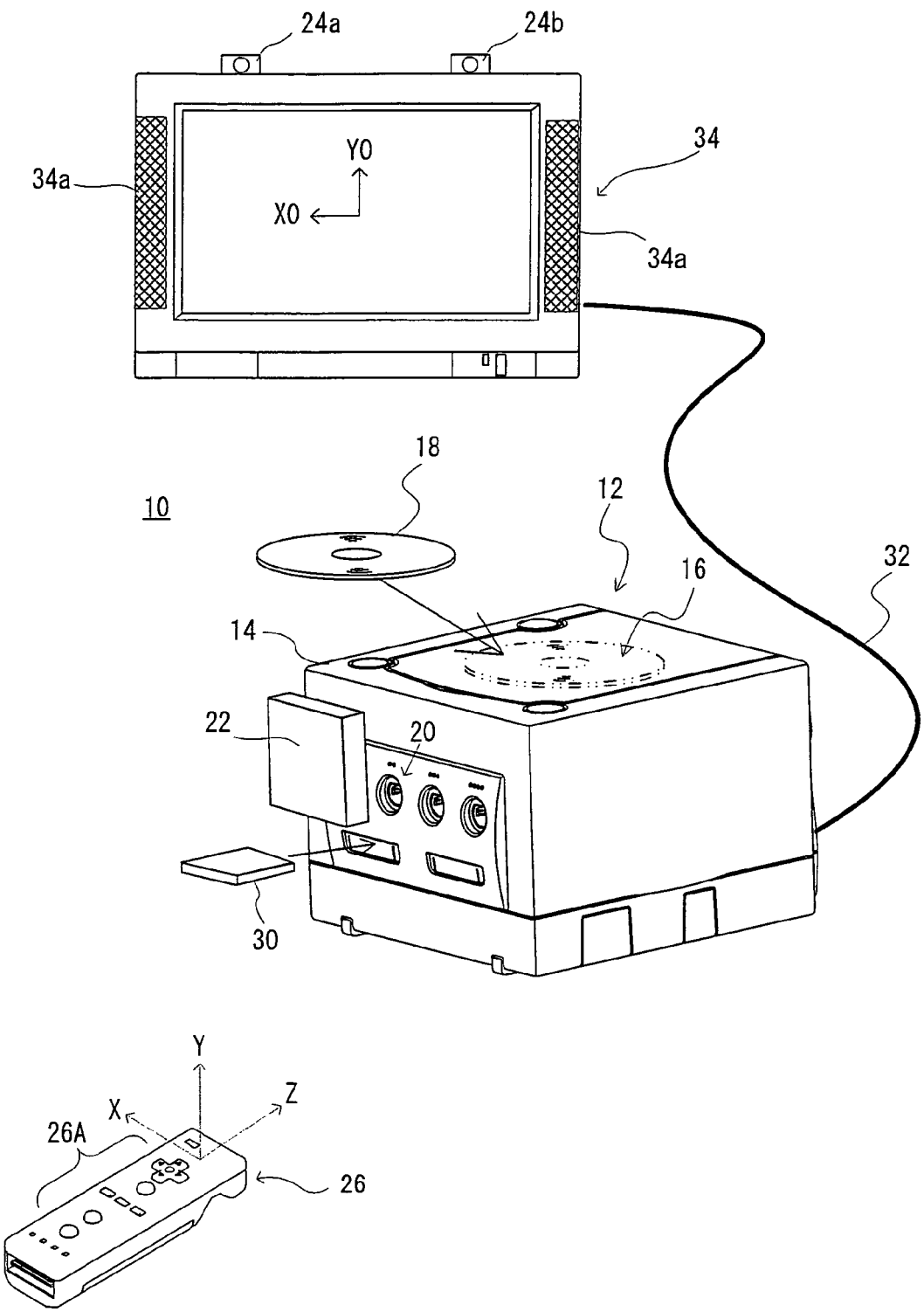
FIG. 1 is an illustrative view showing one exemplary embodiment.

Referring to FIG. 1, a game system 10 as one exemplary embodiment includes a video game apparatus 12. The video game apparatus 12 includes an approximately cubic housing 14, and an optical disc drive 16 is provided on an upper end of the housing 14. Attached to the optical disc drive 16 is an optical disc 18 as an example of information storage medium storing a game program, etc. Provided on a front surface of the housing 14 is a plurality of (four in this exemplary embodiment) connectors 20. These connectors 20 are intended to connect a controller (not shown) to the video game apparatus 12 through a cable (not shown).

Besides, this exemplary embodiment uses a controller 26 having a function of wireless transmission by weak radio waves and a wireless receiving unit 22 having a function of wireless reception by weak radio waves. That is, the wireless receiving unit 22 is attached to one connector 20 in the video game apparatus 12. The attached wireless receiving unit 22 receives a radio signal from the controller 26 and inputs it to the video game apparatus 12 through the connector 20. The wireless communication function does not necessarily use weak radio waves and may utilize another kind of electromagnetic waves such as infrared rays.

The controller 26 has a shape of a flat rectangle and a size capable of being held by one hand. The controller 26 is provided with an operating switch 26A on upper surface thereof. The shape of the controller 26 is not limited to a flat rectangle and may be an oval. The operating switch 26A may be arranged on a lower surface or a side surface, etc., instead of the upper surface. The operating switch 26A is composed of one cross switch and a plurality of button switches, etc. The cross switch is used for designating the direction of a player object's movement, for example. The button switches are utilized for designating the player object's action, for example. The cross switch or the plurality of button switches may be also utilized for menu item selection and control over movement of a pointer or cursor, for instance.

One or a plurality of (two in this exemplary embodiment) memory slots 28 are provided on the front surface of the housing 14 and below the connector 20. A memory card 30 is inserted into the memory slot 28. The memory card 30 is used to load and store temporarily a game program, etc. read out from the optical disc 18 and save data on a game played with the game system 10 (game result data or in-progress game data).

An AV cable connector (not shown) is provided on a rear surface of the housing 14 of the video game apparatus. The connector is used to connect a monitor 34 to the video game apparatus 12 through the AV cable 32. The monitor 34 is typically a color television receiver. The AV cable 32 inputs a video signal from the video game apparatus 12 to a video input terminal of a color TV and inputs a sound signal to a sound input terminal. Accordingly, a game image of a three-dimensional (3D) video game is displayed on a screen of the color TV (monitor) 34, and stereo game sounds such as game music and sound effects are output from speakers 34a on both sides.

In the game system 10, for a player to play a game using the controller 26, the player firstly turns on the video game apparatus 12, next selects an appropriate optical disc 18 in which the game software is stored, and then loads the optical disc 18 into the disc drive 16 of the video game apparatus 12. Accordingly, the video game apparatus 12 starts executing the video game based on the software stored in the optical disc 18. The player operates the controller 26 to provide input to the video game apparatus 12. For example, the player starts the game or another application by manipulating some of the operating switch 26A.

The controller 26 can also serve as a pointing device by arranging two LED modules 24a and 24b both of which emit infrared rays, in proximity to the screen of the display 34. More specifically, the controller 26 photographed infrared rays from the two LED modules 24a and 24b, and obtains an operation signal according to the positions and sizes of two markers (two infrared light sources) in the photographed image. Based on the obtained operation signal, the position of a point pointed to by the controller 26 on the screen is calculated. This makes it possible to input a coordinate and a rotational motion directly to the screen, unlike input operations through switches or buttons. On this account, the controller 26 is also called direct pointing device (DPD).

Figure 2:
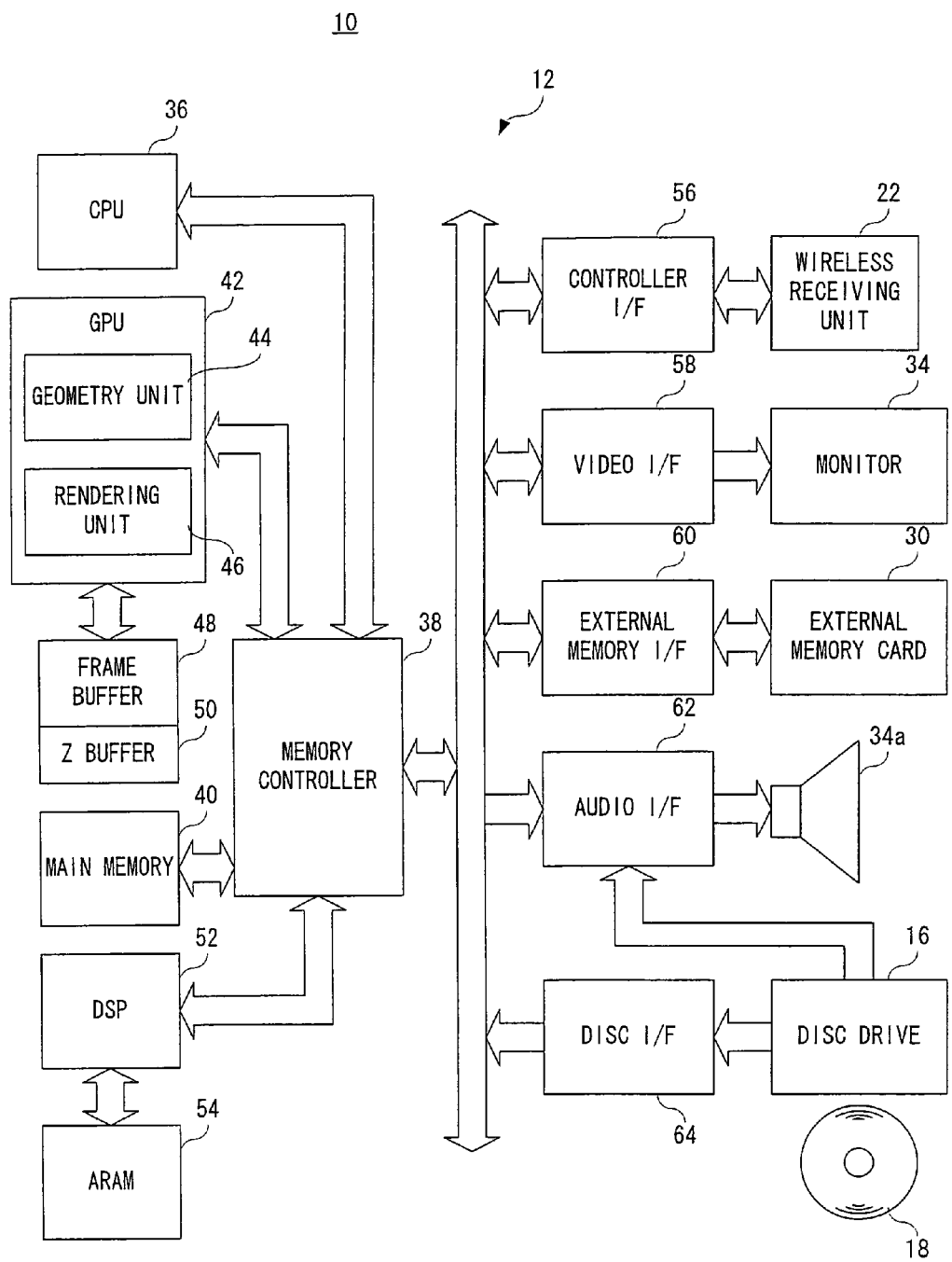
FIG. 2 is a block diagram showing a part of an electrical configuration of FIG. 1 exemplary embodiment (first exemplary embodiment)

FIG. 2 is a block diagram showing an electrical structure of the video game system 10 of FIG. 1 exemplary embodiment. The video game apparatus 12 is provided with a central processing unit (hereinafter referred to as "CPU") 36. The CPU 36 is also called computer or processor, and responsible for entirely controlling the video game apparatus 12. The CPU 36 or computer functions as a game processor and is connected with a memory controller 38 via a bus. The memory controller 38 mainly controls writing to and reading from a main memory 40 connected via the bus, under control of the CPU 36. The memory controller 38 is connected with a GPU (Graphics Processing Unit) 42.

The GPU 42 constitutes a part of a rendering means and consists of a single-chip ASIC, for example. It receives a graphics command (rendering order) from the CPU 36 via the memory controller 38, and generates a three-dimensional (3D) game image according to the command by using a geometry unit 44 and a rendering unit 46. More specifically, the geometry unit 44 carries out coordinate operation processes such as rotation, movement and transformation of various objects and objects in a three-dimensional coordinate system (consisting of a plurality of polygons. The polygon denotes a multiangular plane defined by at least three vertex coordinates.) The rendering unit 46 subjects each polygon of various objects to image generating processes such as pasting a texture (pattern image). Accordingly, 3D image data to be displayed on the game screen is generated by the GPU 42 and stored in a frame buffer 48.

Further, the GPU 42 obtains data (primitives or polygons, textures etc.) required for the GPU 42 to execute the rendering command, from the main memory 40 via the memory controller 38.

The frame buffer 48 is a memory for rendering (accumulating) one frame of image data in a raster scan monitor 34, for example, and is updated by the GPU 42 on a frame-by-frame basis. More specifically, the frame buffer 48 stores color information of an image in orderly sequence on a pixel-by-pixel basis. The color information here is data of R, G, B and A, and for example, 8-bit R (red) data, 8-bit G (green) data, 8-bit B (blue) data and 8-bit A (alpha) data. Also, the A data is data on mask (mat image). A video I/F 58 described later reads out the data from the frame buffer 48 via the memory controller 38, thereby displaying a 3D game image on the screen of the monitor 34.

In addition, a Z buffer 50 has a capacity equivalent to the number of pixels corresponding to the frame buffer 48× the number of bits of depth data per pixel, and stores depth information or depth data (Z value) of a dot corresponding to each storage position in the frame buffer 48.

Besides, both the frame buffer 48 and the Z buffer 50 may be formed with one part of the main memory 40, and also may be provided inside the GPU 42.

The memory controller 38 is also connected to an audio RAM (hereinafter referred to as ARAM) 54 via a DSP (Digital Signal Processor) 52. Thus, the memory controller 38 controls not only the main memory 40 but also writing to and/or reading from the ARAM 54 as a sub-memory.

The DSP 52 serves as a sound processor and generates audio data corresponding to sounds, voice or music required for the game by using sound data (not shown) stored in the main memory 40 or audio waveform data (not shown) written into the ARAM 54.

The memory controller 38 is further connected via the bus to interfaces (I/F) 56, 58, 60, 62 and 64. The controller I/F 56 is an interface for the controller 26 connected to the video game apparatus 12 via the wireless receiving unit 22. The controller 26 modulates a weak radio wave by an operation signal from the operating switch 26A and transmits a weak radio wave signal (a detailed description will be given later). The wireless receiving unit 22 receives the weak radio wave signal transmitted from the controller 26 and demodulates it into an operation signal. The controller I/F 56 provides the CPU 36 via the memory controller 38 with the operation signal demodulated by the wireless receiving unit 22.

The video I/F 58 accesses the frame buffer 48 to read image data produced by the GPU 42 and provide an image signal or image data (digital RGBA pixel value) to the monitor 34 via the AV cable 32 (FIG. 1).

The external memory I/F 60 links a memory card 30 (FIG. 1) inserted into the front surface of the video game apparatus 12, with the memory controller 38. This allows the CPU 36 to write data into the memory card 30 or read out data from the memory card 30 via the memory controller 38. The audio I/F 62 receives audio data provided by the DSP 52 via the memory controller 38 or an audio stream read out from the optical disc 18, and provides the speaker 34a of the monitor 34 with an audio signal (sound signal) corresponding to it.

Furthermore, the disc I/F 64 connects the disc drive 16 to the memory controller 38, which causes the CPU 36 to control the disc drive 16. Program data, texture data and the like read out by the disc drive 16 from the optical disc 18 are written into the main memory 40 under control of the CPU 36.

Figure 3:
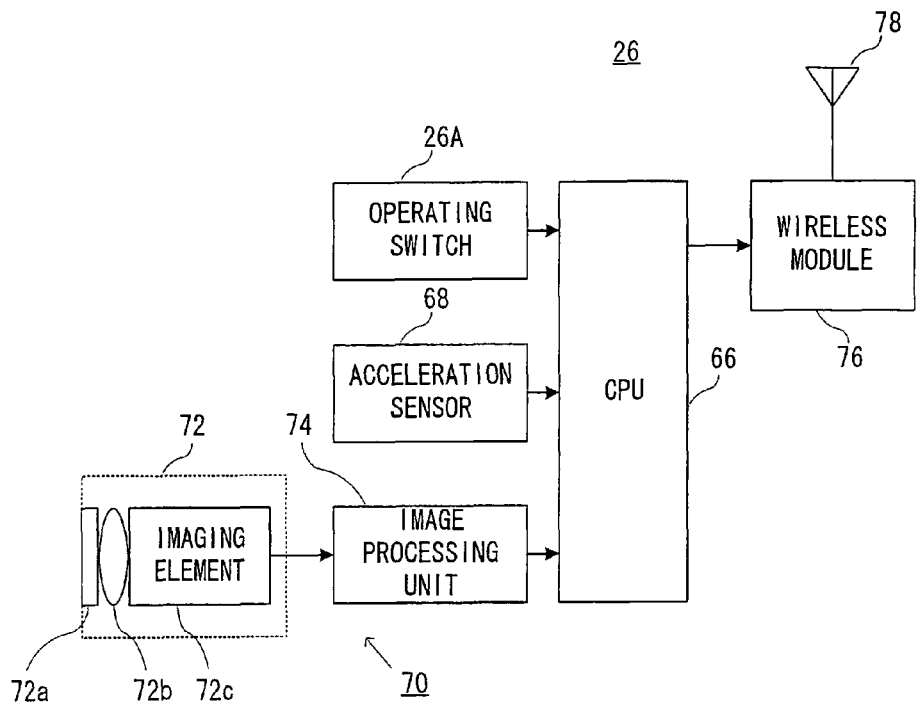
FIG. 3 is a block diagram showing a part of another electrical configuration of FIG. 1 exemplary embodiment.

An electrical configuration of the controller 26 is shown in FIG. 3. Referring to FIG. 3, the controller 26 includes an imaging information arithmetic unit 70. The imaging information arithmetic unit 70 has an infrared imaging unit 72 provided at a front end of the controller 26 and an image processing circuit 74 for processing data on an image photographed by the imaging unit 72. The imaging unit 72 includes a solid-state imaging element 72c such as a CMOS sensor or a CCD. Arranged in front of the imaging element 72c are an infrared ray filter (filter through which only infrared rays can pass) 72a and a lens 72c. Accordingly, the imaging unit 72 detects only infrared rays to generate image data. The image processing circuit 74 processes infrared image data obtained from the imaging unit 72, detects a high-brightness portion, detects its center of gravity and area, and outputs the data. The data on the position and area of the high-brightness portion is input from the image processing circuit 74 to the CPU 66.

The controller 26 also includes an acceleration sensor 68. The acceleration sensor 68 outputs acceleration data (acceleration signal) of straight line components of three axes X, Y and Z (see FIG. 1). The XYZ coordinate system formed by these three axes moves/rotates together with the controller 26 (the acceleration sensor 68) (hereinafter referred to as "local coordinate system").

Further input into the CPU 66 are acceleration data from the acceleration sensor 68 and an operation signal from the above-mentioned operating switch 26A. The CPU 66 detects which switch or button is being operated at that time, based on the operation signal from the operating switch 26A. Then, the CPU 66 outputs the operation data together with the acceleration data and the high-brightness portion data, as a string of controller data, and inputs it into a wireless module 76. The wireless module 76 demodulates a carrier wave at a predetermined frequency by the controller data, and emits a weak signal from the antenna 78.

Figure 4:
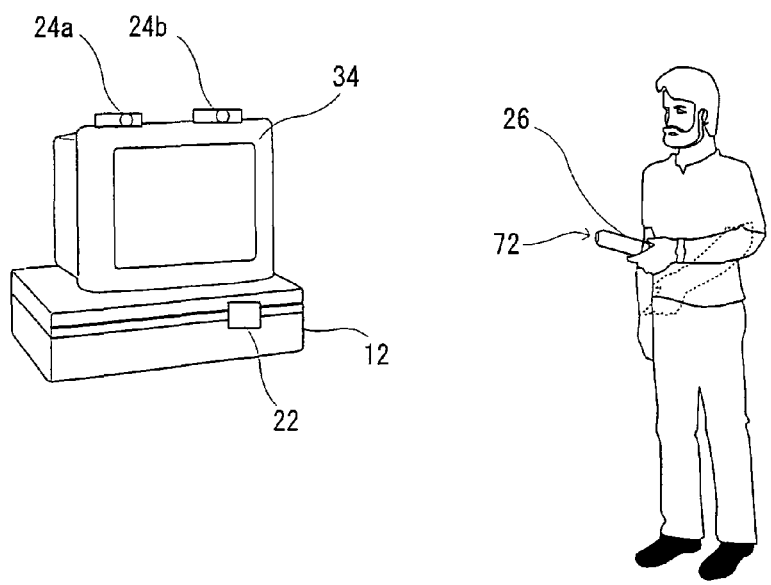
FIG. 4 is an illustrative view showing how to play a game with FIG. 1 exemplary embodiment.

In playing a game with the controller 26 on the game system 10, the player holds the controller 26 by one hand as shown in FIG. 4. Then, the player directs the imaging unit 72 at the front end of the controller 26 toward the screen of the display 34. The two LED modules 24a and 24b provided in proximity to the screen of the display 34 output infrared rays, and the imaging unit 72 of the controller 26 held by the player incorporates the infrared-ray filter 72a as described above (see FIG. 3).

The image processing circuit 74 processes the photographed image containing the infrared rays to obtain information on the positions and areas of the LED modules 24a and 24b, as information on the high-brightness point. The obtained data on the positions and sizes of the high-brightness points is transmitted wirelessly (by weak radio waves) to the video game apparatus 12. The game apparatus 12 uses the received data on the positions and sizes of high-brightness points to calculate the position on the screen pointed to by the controller 26. More specifically, the position of a middle point between the two high-brightness points is adopted as the position to which the controller 26 is directed, that is, the pointed position. When the player moves the controller 26, the high-brightness points are changed in position and size. By taking advantage of that, the CPU 36 of the video game apparatus 12 can obtain an operation signal corresponding to the movement of the controller 26, and thus can make the game processing progress according to a change in the pointed position on the screen.

As above, the imaging information arithmetic unit 70 makes it possible to photograph a marker (infrared rays from the LEDs in this exemplary embodiment) and obtain an operation signal according to changes in the position and size of the marker in the photographed image, which allows direct inputs of a coordinate and a rotational motion into the screen, unlike operations through the finger-controlled operating switches, operating key or operating button. A more detailed description of the principle of such an imaging information arithmetic unit will be omitted here because it is well known as described in Japanese Patent No. 3422383.

Besides, the above mentioned DPD function in image processing will not be effective unless there exists a marker in the imaging area of the imaging unit 72. In a certain kind of game, the acceleration data from the acceleration sensor 68 is utilized for a time period during when an effective operation signal (DPD coordinate data, that is, the position of the point on the screen pointed to by the controller) cannot be obtained from the image processing circuit 74 as mentioned above. Such a game includes a wood-splitting game described below.

Figure 5:
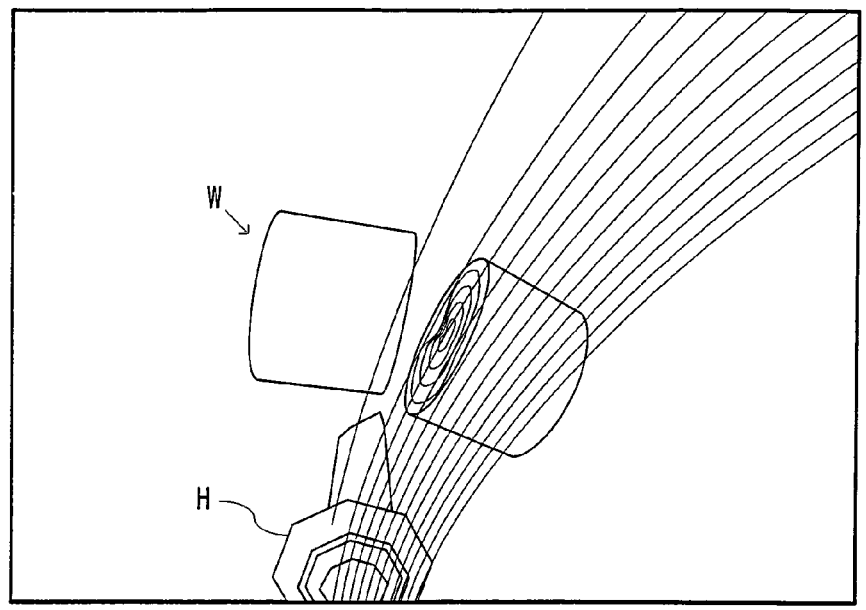
FIG. 5 is an illustrative view showing one example of game screen applied to FIG. 1 exemplary embodiment.
Figure 6:
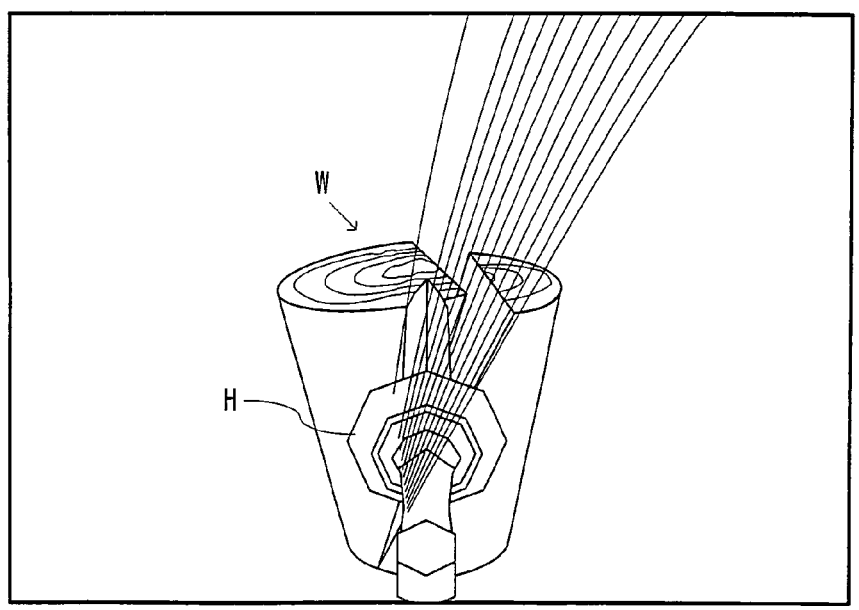
FIG. 6 is an illustrative view showing another example of game screen applied to FIG. 1 exemplary embodiment.
Figure 7:
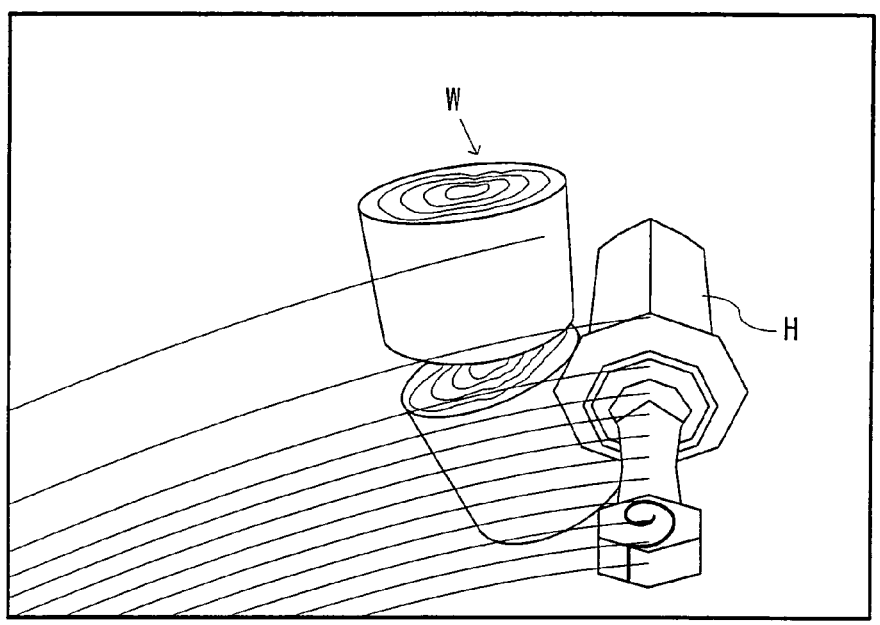
FIG. 7 is an illustrative view showing still another example of game screen applied to FIG. 1 exemplary embodiment.

In a wood-splitting game, as shown in FIG. 5 to FIG. 7, a wood W appears on the display 34. The player splits the displayed wood W with the controller 26 likened to a hatchet H. For example, when the player brings downward the controller 26, the wood W is vertically split (see FIG. 5). Also, when the player swings the controller 26 obliquely the wood W is split in an oblique direction (see FIG. 6). In addition, when the player swings the controller 26 sideways, the wood W is horizontally split (see FIG. 7).

That is, when the player swings the controller 26 in a desired direction, the controller 26 transmits acceleration data according to the movement. The DPD coordinate data is further transmitted for a time period during when the imaging unit 72 captures the marker. The video game apparatus 12 calculates the swing direction of the controller 26, based on the DPD coordinate data when it can be received from the controller 26, or based on the acceleration data when it cannot be received. Then, the wood W is cut in the calculated direction.

In this exemplary embodiment, a cut surface passes through the center of the wood W and thus only the swing direction is calculated. Alternatively, the position of a cut point may be determined on the basis of the DPD coordinate data and the acceleration data to cut the wood W in such a manner that the movement of the controller passes through the determined cut point (see FIG. 25 and FIG. 26 described later).

Figure 8:
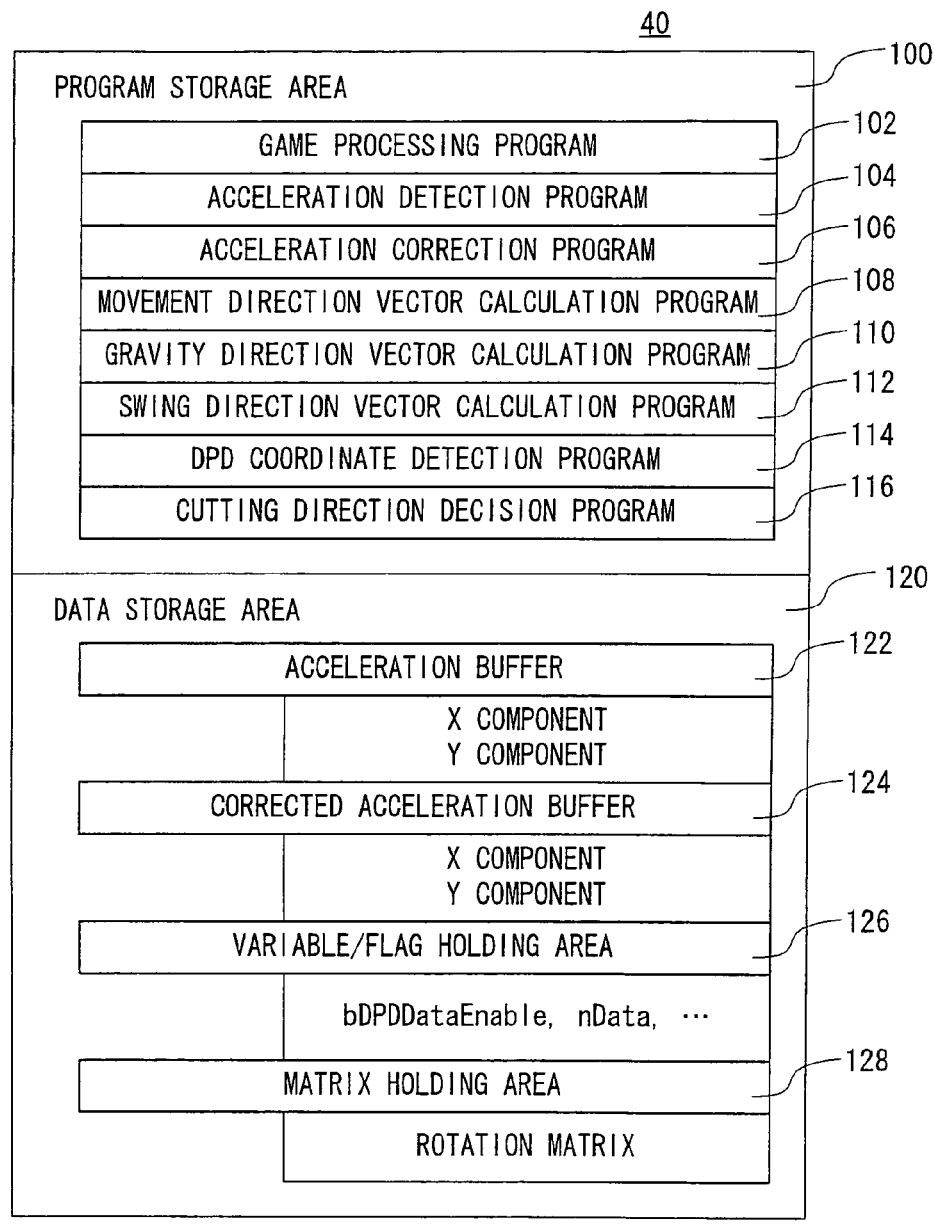
FIG. 8 is an illustrative view showing a memory map applied to FIG. 1 exemplary embodiment.

FIG. 8 shows a memory map of the main memory 40 in playing a wood-splitting game. The main memory 40 includes a program storage area 100 and a data storage area 120. Referring to FIG. 8, the program storage area 100 includes a game processing program 102, an acceleration detection program 104, an acceleration correction program 106, a movement direction vector calculation program 112, a DPD coordinate detection program 114, and a cutting direction decision program 116.

The game processing program 102 executes basic processes required for progress of the wood-splitting game, such as reception processing for receiving a signal from the controller 26 and image processing for displaying a moving image of wood splitting (see FIG. 5 to FIG. 7). The acceleration detection program 104 detects the acceleration of the controller 26, based on a signal from the controller 26.

The acceleration correction program 106 corrects the acceleration detected by the acceleration detection program 104. More specifically, the acceleration sensor has a property of outputting a value within a range of −2.2G to 2.2G for each of the X, Y and Z axes. Accordingly, if the acceleration of the controller 26 exceeds this range, some of the values output from the acceleration sensor become invalid in positions around −2.2G and 2.2G, as shown in FIG. 10 (A). The acceleration correction program 106 corrects those output values as shown in FIG. 10 (B). Besides, FIG. 11, FIG. 12, FIG. 13 (A) and FIG. 13 (B) illustrate the ways for acceleration correction by the acceleration correction program 106 (described later).

The movement direction vector calculation program 108 calculates a movement direction vector ($V_m$: see FIG. 9 (A)) based on the acceleration value corrected as necessary. The gravity direction vector calculation program 110 calculates a gravity direction vector ($V_g$: see FIG. 9 (B)) based on the acceleration value corrected as necessary. The swing direction vector calculation program 112 calculates a swing direction vector ($V_s$: see FIG. 9 (C)) based on the calculated movement direction vector and the calculated gravity direction vector.

The DPD coordinate detection program 114 detects a DPD coordinate based on a signal from the controller 26. The cutting direction decision program 116 decides a cutting direction based on either the calculated swing direction vector or the detected DPD coordinate.

The data storage area 120 has an acceleration buffer 122, a corrected acceleration buffer 124, a variable/flag holding area 126 and a matrix holding area 128, etc. Although not shown, the data storage area 120 also stores image data for game screen and results of the processes by the above mentioned programs (102 to 116).

Out of the accelerations of three components detected by the acceleration detection program 104, the acceleration buffer 122 stores the accelerations of the X component and Y component, provided that the Z component satisfies a predetermined requirement (described later). The corrected acceleration buffer 124 stores the X component and Y component corrected by the acceleration correction program 106 (a two-dimensional vector composed of the corrected X and Y components will be hereinafter referred to as simply "acceleration vector".). The variable/flag holding area 126 holds variables and flags referred to by the programs (e.g. bDPDataEnable, nData described later). The matrix holding area 128 holds a rotational matrix used by the swing direction vector calculation program 112 for calculation of a swing direction vector (or an equivalent arithmetic expression; see expressions (3) and (4)).

Here, a detailed description will be given as to the method for deciding a swing direction based on the output from the acceleration sensor in this exemplary embodiment. Firstly, the principle of the method will be described with reference to FIG. 9 (A) to FIG. 9 (C). Referring to FIG. 9 (A), the movement direction vector $V_m$ is a two-dimensional unit vector that indicates the movement direction of the controller 26 in an XY plane and is calculated by expression (1) shown below, based on the acceleration vector in the corrected acceleration buffer 124.

$$V_m = \Sigma[|A_{t+1} - A_t|(A_{t+1} - A_t)] \quad (1)$$

where $A_t$ denotes an acceleration vector at time t, and $\Sigma$ denotes total sum of swing start time to swing finish time.

As stated above, a vector $(A_{t+1} - A_t)$ indicative of an acceleration change at intervals of unit of time is multiplied by its magnitude $|A_{t+1} - A_t|$, and integrated for a time period of the swing start time to the swing finish time. Thus, the movement direction vector $V_m$ has a dimension of speed. The multiplication by the magnitude of acceleration change is performed for the purpose of rating relatively highly a portion with a larger acceleration change. In FIG. 9 (A), $V_m$ denotes a value determined by normalizing a result of the above expression (1).

For conformity with the local coordinate system (X-Y coordinate system), the obtained movement direction vector $V_m$ needs to be rotated so as to suit with the stationary coordinate system (X0-Y0 coordinate system: see FIG. 1). Rotational arithmetic operation for that can be determined from a gravity direction vector $V_g$ as shown in FIG. 9 (B).

The gravity direction vector Vg in FIG. 9 (B) is calculated by following expression (2):

$$V_g = \Sigma A_t \quad (2)$$

where $A_t$ is an acceleration vector at time t, and $\Sigma$ represents total sum of acceleration vectors from swing start time to swing finish time.

As stated above, by integrating the acceleration vector $A_t$ from the swing start time to the swing finish time, an acceleration/deceleration component due to movement of the controller 26 is canceled out, and a gravity component alone is extracted. In FIG. 9 (B), $V_g$ is a value determined by normalizing a result of the above expression (2).

By subjecting the movement direction vector $V_m$ to an arithmetic operation so that the calculated gravity direction vector $V_g$ is rotated in a vertical downward direction, a swing direction vector $V_s$ can be obtained in conformity with the stationary coordinate system.

Accordingly, the swing direction vector $V_s = (sx, sy)$ can be determined by following expressions (3) and (4), on the assumption that $Vm=(mx, my)$ and $V_g=(gx, gy)$.

$$sx = -gy \times mx + gx \times my \quad (3)$$

$$sy = -gx \times mx - gy \times my \quad (4)$$

Next, the method for acceleration correction shown in FIG. 10 (A) and FIG. 10 (B) is described in detail by reference to FIG. 11, FIG. 12, FIG. 13 (A) and FIG. 13 (B). If the acceleration of the controller 26 falls within the detection range of the acceleration sensor 68 (−2.2G to 2.2G), there is no need for such a correction. The same thing applies to the case of using an acceleration sensor with a significantly wide detection range.

In the correction process of this exemplary embodiment, two-dimensional Bezier curve C is utilized as shown in FIG. 11. Referring to FIG. 11, the Bezier curve C is described as shown in following expressions (5) to (9), with respect to four control points $P_0$ to $P_3$ and a parameter u ($0 \leq u \leq 1$).

$$P = P_0 Bez0 + P_1 Bez1 + P_2 Bez2 + P_3 Bez3 \quad (5)$$

$$Bez0 = (1-u)^3 \quad (6)$$

$$Bez1 = 3u(1-u)^2 \quad (7)$$

$$Bez2 = 3u^2(1-u) \quad (8)$$

$$Bez3 = u^3 \quad (9)$$

Accordingly, when the four control points $P_0$ to $P_3$ are determined, an arbitrary point P on the curve C can be determined by specifying the parameter u among a range of values 0 to 1. Thus, as shown in FIG. 11, the acceleration immediately before the value becomes invalid is brought into correspondence with the control point $P_0$, and the acceleration immediately after the value becomes invalid is brought into correspondence with the control point $P_3$. Then, assuming that $V_A = P_0 - A$ and $V_B = P_3 - B$, the remaining two control points $P_1$ and $P_2$ are calculated by following expressions (10) and (11).

$$P_1 = P_0 + (V_A + V_0 \times K_0) \times n \times K_1 \quad (10)$$

$$P_2 = P_3 + (V_B + V_0 \times K_0) \times n \times K_1 \quad (11)$$

where n represents the number of acceleration points where the value is invalid (four black points in FIG. 11 example), $K_0$ and $K_1$ are scalar values for adjustment of recognition state. In this manner, even if either $V_A$ or $V_B$ is not appropriate due to some error, multiplying $V_A$ or $V_B$ by a constant of $V_0$ prevents a correction in a wrong direction.

In addition, $V_0$ is a unit vector (see FIG. 13 (A)) that indicates pre-correction acceleration data series, that is, the broad alignment of acceleration data in the acceleration buffer 122 (see FIG. 8), and can be determined by applying the above mentioned expression (1) to the pre-correction acceleration data series.

The direction of $V_0$ may be reversed as required in accordance with the direction of correction (that is, depending on in which direction the data series will be expanded). More specifically, $V_0$ is reversed only when an inner product between $(P_0 + P_3)$ and $V_0$ is negative (that is, an angle formed by the two is obtuse). In FIG. 13 (A), for example, correction is carried out at two points where X=2.2G and X=−2.2G. The former correction, that is, the correction at X=2.2G is opposite in direction to $V_0$ and thus $V_0$ is reversed as shown in FIG. 13 (B). On the other hand, the latter correction is in the same direction as $V_0$ and there is no need to reverse $V_0$.

When the four control points $P_0$ to $P_3$ are obtained, n points on Bezier curve C are determined while the parameter u is changed by the above mentioned expressions (5) to (9), and the determined n points are taken as post-correction acceleration data. Then, such a corrective calculation is carried out at all the points where the values are invalid. In FIG. 13 (A), for example, four points are determined in proximity to the point of X=2.2G and three points are calculated in proximity to the point of X=−2.2G.

In deciding the cutting direction in the wood-splitting game, the CPU 36 executes processes according to the flowcharts shown in FIG. 14 to FIG. 19. Firstly, referring to FIG. 14, the CPU 36 sets "false" to bDPDDataEnable and "0" to nData in a step S1. Besides, bDPDDataEnable is a flag indicating whether a valid DPD coordinate is obtained or not, and is given "false" when no valid DPD coordinate is obtained, or is given "true" when a valid DPD coordinate is obtained. The variable nData indicates the number of acceleration vectors detected.

In a step S3, the CPU 36 fetches the detected values from the acceleration sensor 68, and sets the fetched values, i.e., the acceleration values in three directions of X, Y and Z to acc.x, acc.y and acc.z, respectively. In a step S5, the CPU 36 determines whether acc.z exceeds 1.1G or not, and if NO, the CPU 36 returns to the step S3.

If YES in the step S5, the CPU 36 moves to a step S7 to record in the acceleration buffer 122 (see FIG. 8) acc.x and acc.y (a two-dimensional acceleration vector formed by X and Y components) corresponding to acc.z larger than 1.1G. Then, the CPU 36 increments nData in a step S9 and moves to a step S29.

If NO in the step S5, the CPU 36 determines in a step S11 whether nData is larger than a constant D (e.g. "20") or not. If NO in the step S11, that is, if the number of the acceleration vectors recorded in the acceleration buffer 122 is D or less, the CPU 36 sets "0" to nData in a step S27 and then goes to the step S29.

If YES in the step S11, the CPU 36 determines in a step S13 whether or not there exists in the acceleration buffer 122 any acceleration component (acc.x or acc.y) having an absolute value larger than 2.2G. If NO in the step S13, the CPU 36 goes to the step S17. If YES, the CPU 36 executes the above mentioned acceleration correction processes as shown in FIG. 10 to FIG. 12, FIG. 13 (A) and FIG. 13 (B). The corrected acceleration vectors are recorded in the corrected acceleration buffer 124. After recording, the CPU 36 moves to the step S17.

In the step S17, the CPU 36 calculates the movement direction vector Vm (see FIG. 9 (A)) based on the corrected acceleration vectors stored in the corrected acceleration buffer 124 (or based on the acceleration vectors stored in the acceleration buffer 122 if no correction was made). In the step S19, the CPU 36 calculates the gravity direction vector $V_g$ (see FIG. 9 (B)) based on the corrected acceleration vectors (or the acceleration vectors) as in the previous step. In a step S21, the CPU 36 calculates the swing direction $V_s$ (see FIG. 9 (C)) based on the calculated movement direction vector $V_m$ and the calculated gravity direction vector $V_g$.

In a step S23, the CPU 36 decides the cutting direction from the swing direction vector $V_s$ calculated in the step S21 or from an inclination between two DPD coordinates determined in steps S29 to S43 described later. Then, the CPU 36 executes a success representation process in a step S25, and returns to the step S1. In the success representation process, screens as shown in FIG. 5 to FIG. 7 are displayed in accordance with the decided cutting direction.

Figure 15:
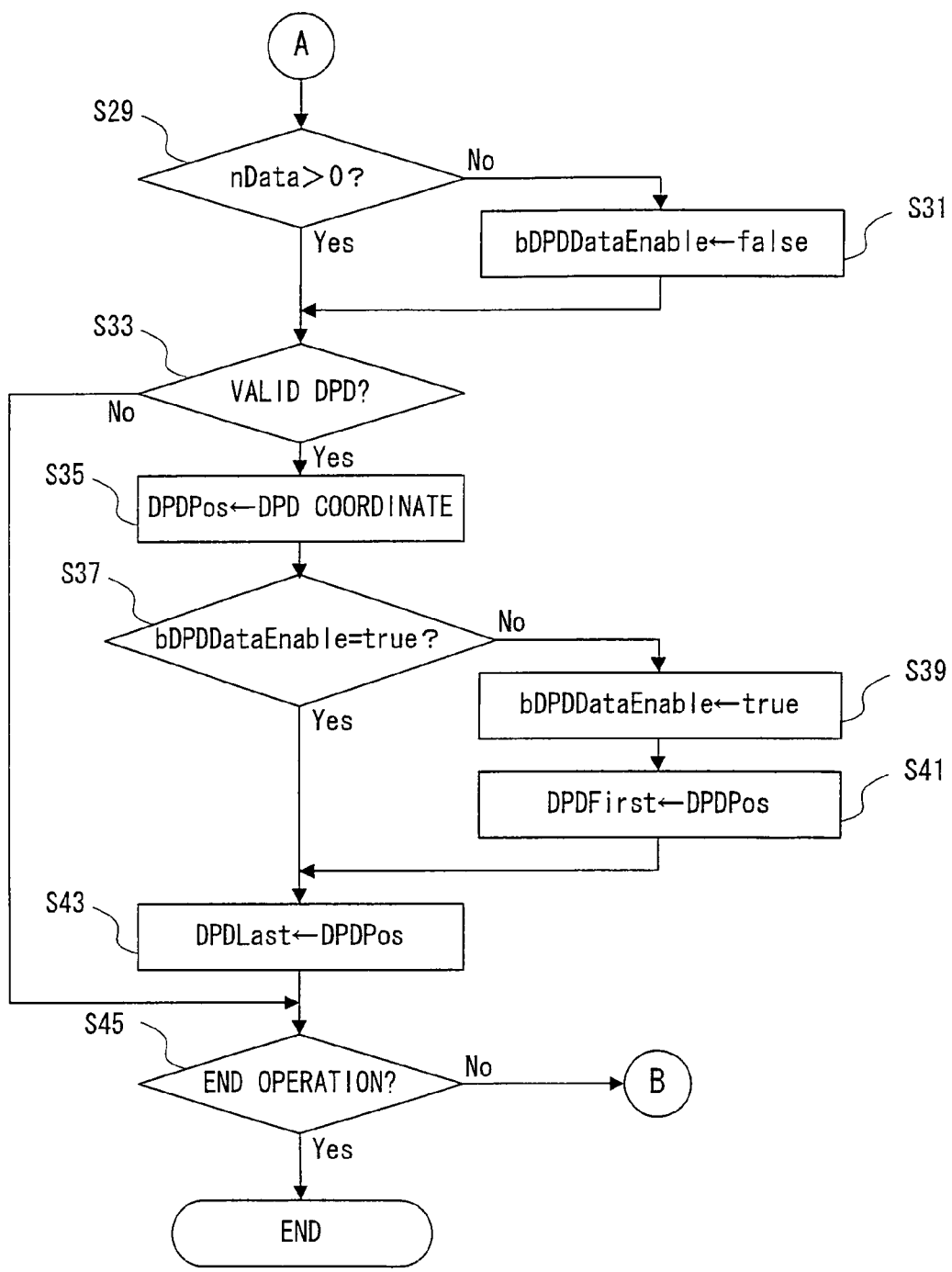
FIG. 15 is a flowchart showing another part of operation of the CPU applied to FIG. 1 exemplary embodiment.

Referring to FIG. 15, the CPU 36 determines in a step S29 whether nData is larger than "0" or not, and if YES, the CPU 36 moves to a step S33. If NO in the step S29, this means nData=0 (that is, no acceleration larger than 1.1G is detected in the Z-axis direction, or the number of accelerations larger than 1.1G in the Z-axis direction consecutively detected is equal to or less than a predetermined value (constant D)). Thus, the CPU 36 concludes that this is not a swing motion such as wood splitting, sets "false" to bDPDDataEnable in a step S31, and executes a step S33 and then moves to a step S45. More specifically, the CPU 36 concludes that no DPD coordinate based on wood splitting can be obtained, and sets a flag indicating unavailability of a valid DPD coordinate. In the step S33, the CPU 36 determines whether the controller 26 has detected any valid DPD coordinate (pointed position on the screen), and if NO, the CPU 36 goes to the step S45.

If YES in the step S33, the CPU 36 executes a series of processes of steps S35 to S43, and then moves to the step S45. In the step S35, the CPU 36 sets the obtained DPD coordinate to DPDPos. In the step S37, the CPU 36 determines whether bDPDDataEnable is "true" or not. If YES, the CPU 36 moves to the step S43. If NO, the CPU 36 executes the steps S39 and S41, and then moves to the step S43.

In the step S39, the CPU 36 concludes that some valid DPD coordinate has been obtained, sets "true" to bDPDDataEnable. In the step S41, the CPU 36 sets DPDPos to DPDFirst indicating a first detected coordinate out of the valid DPD coordinates.

In the step S43, the CPU 36 sets DPDPos to DPDLast indicating a last detected coordinate out of the valid DPD coordinates. Then, the CPU 36 determines in the step S45 whether an end operation has been carried out or not, and if NO, the CPU 36 returns to the step S3 to repeat the process. If YES, the CPU 36 ends the cutting direction decision process. By repeatedly executing the process shown in FIG. 14 and FIG. 15 at intervals of unit of time, the value of DPDLast is updated while accelerations of predetermined values (accelerations larger than 1.1G in the Z-axis direction) are consecutively detected, and finally the last DPD coordinate within that time period is set to DPDLast.

Figure 16:
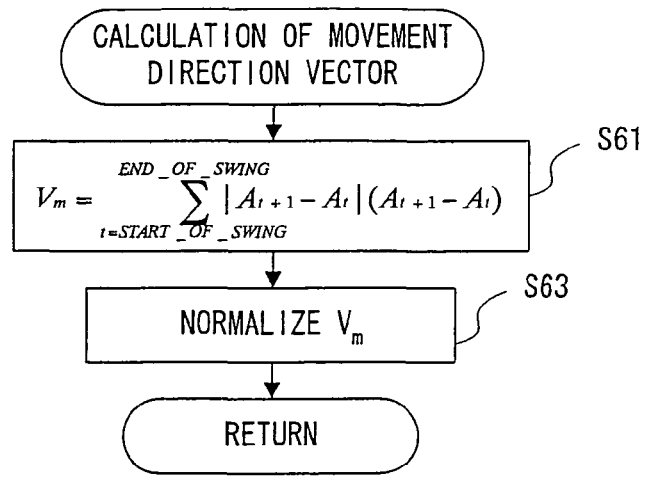
FIG. 16 is a flowchart showing still another part of operation of the CPU applied to FIG. 1 exemplary embodiment.

The above mentioned movement direction vector calculation process in the step S17 conforms to a subroutine shown in FIG. 16. Referring to FIG. 16, in a step S61, the CPU 36 calculates the movement direction vector $V_m$ by the above mentioned expression (1) (the details are provided above.). In a step S63, the CPU 36 normalizes the calculated movement direction vector V. Then, the CPU 36 returns to the higher-level routine.

Figure 17:
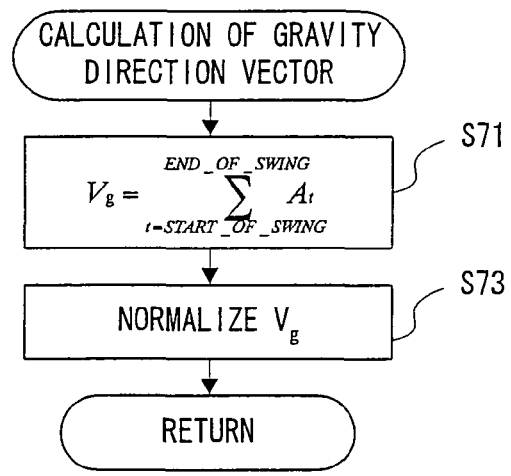
FIG. 17 is a flowchart showing yet another part of operation of the CPU applied to FIG. 1 exemplary embodiment.

The above-mentioned gravity direction vector calculation process in the step S19 conforms to a subroutine shown in FIG. 17. Referring to FIG. 17, in a step S71, the gravity direction vector $V_g$ is calculated by the above stated expression (2) (the details are described above.). In a step S73, the CPU 36 normalizes the calculated gravity direction vector Vg. Then, the CPU 36 returns to the higher-level routine.

Figure 18:
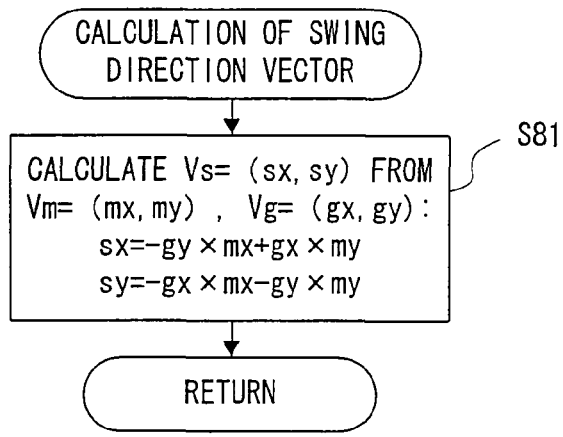
FIG. 18 is a flowchart showing further another part of operation of the CPU applied to FIG. 1 exemplary embodiment.

The above-stated swing direction vector calculation process in the step S21 conforms to a subroutine shown in FIG. 18. Referring to FIG. 18, in a step S81, the CPU 36 calculates the swing direction vector $V_s$ by the rotational matrix held in the matrix holding area 128 (this is the same as the cases with the above mentioned expressions (3) and (4).) from the movement direction vector $V_m$ and the gravity direction vector $V_g$ (the details are described above.). Then, the CPU 36 returns to the higher-level routine.

Figure 19:
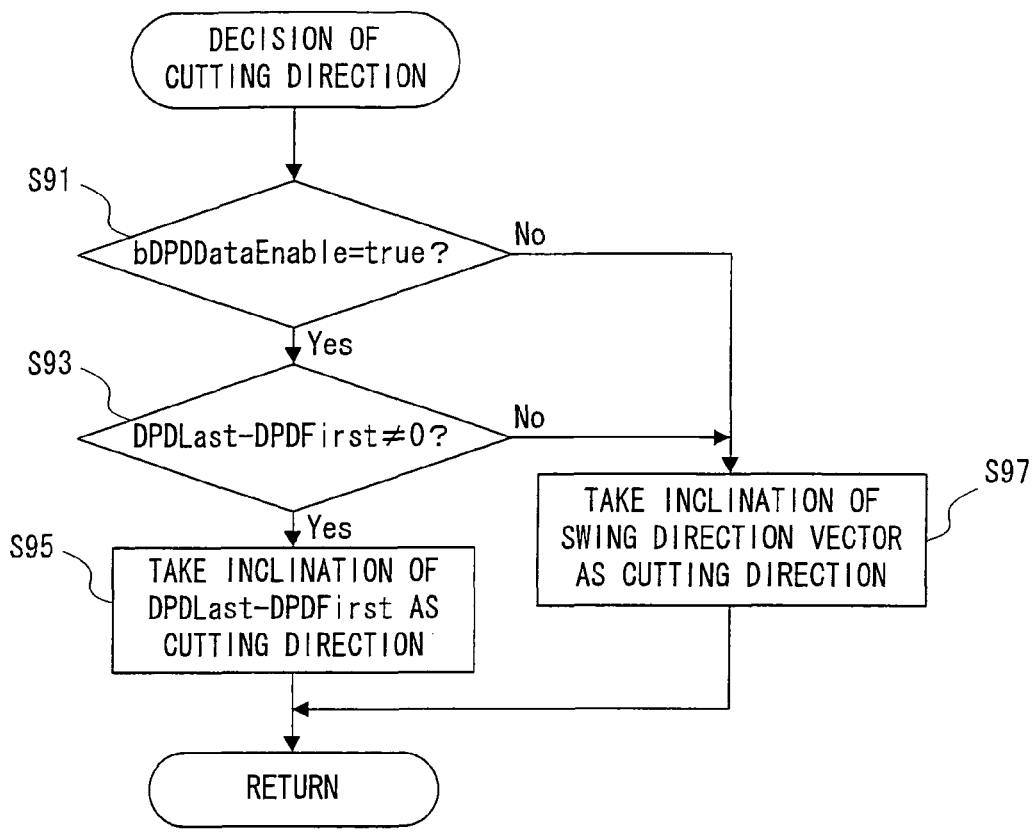
FIG. 19 is a flowchart showing another part of operation of the CPU applied to FIG. 1 exemplary embodiment.

The above-mentioned cutting direction decision process of step S23 follows a subroutine shown in FIG. 19. Referring to FIG. 19, in a step S91, the CPU 36 determines whether bDPDDataEnable is "true" or not. If YES, this means that a valid DPD coordinate has been obtained, and thus the CPU 36 determines in a step S93 whether a difference between DPDLast and DPDFirst is of a value other than "0" or not. If YES, that is, if DPDLast DPDFirst, the swing direction of the controller 26 can be identified on the basis of a transition from start point to end point of the valid DPD coordinate. In a step S95, thus, the CPU 36 obtains an inclination of {DPDLast−DPDFirst}, that is, an inclination of vector from DPDFirst to DPDLast, and takes it as cutting direction. If NO in the step S91 or S93, this means the swing direction of the controller 26 cannot be identified on the basis of a transition from the start point to the end point of the valid DPD coordinates, and therefore the CPU 36 moves to a step S97 to take the swing direction vector $V_s$ determined in the step S21 as cutting direction. After deciding the cutting direction, the CPU 36 returns to the higher-level routine.

As apparent from the above, in this exemplary embodiment (the first exemplary embodiment), the game system (10) comprises the display device (34) for displaying a game screen updated in accordance with the progress of game processing, a pointing device (26) for pointing to an arbitrary point on the game screen displayed by the display device, and an acceleration sensor (68) provided in the pointing device. The processor (36) of the game system (10) identifies repeatedly the position of a point pointed to by the pointing device (S35), and detects a change in the identified position (S41, S43, S93). In addition, the CPU 36 determines the movement direction of the pointing device based on the accelerations detected by the acceleration sensor (S97). Then, when a position change is detected, the CPU 36 executes game processing based on the position change, and when no position change is detected, the CPU 36 executes game processing based on the determined movement direction (S25).

In this manner, when a change in the position of a point on the screen pointed to by the pointing device is detected, game processing is carried out on the basis of the position change, and when no position change is detected, game processing is carried out on the basis of the movement direction determined by the result of detection by the acceleration sensor. This makes the game processing advance smoothly by using the movement direction even if the position pointed to by the pointing device cannot be identified.

The processor also determines whether or not the acceleration detected by the acceleration sensor is equal to or more than the threshold value (S5), and identifies the pointed position only for a time period during when it is determined that the acceleration is equal to or more than the threshold value. This increases the efficiency of position identification and prevents the game processing from being wrongly performed due to the player's unintentional movement of the pointing device due to hand shaking or the like.

In addition, the processor calculates the speed direction of the pointing device in the local coordinate system moving together with the pointing device, by accumulatively adding a change in the acceleration detected by the acceleration sensor (S17). Further, the processor calculates the gravity direction in the local coordinate system by accumulatively adding the acceleration detected by the acceleration sensor (S19). Then, the processor calculates the speed direction in the stationary coordinate system by subjecting the calculated speed direction to a rotational arithmetic operation so that the calculated gravity direction matches the gravity direction in the stationary coordinate system (S21). This allows the game processing to be accurately carried out using the speed direction in the stationary coordinate system, regardless of the attitude of the pointing device.

Each of the above calculations is carried out on two of the three acceleration components in the X, Y and Z directions output from the acceleration sensor, which correspond to the X and Y directions. The determination on acceleration is carried out on the acceleration component corresponding to the Z direction. For that, it is possible to use a single three-directional acceleration sensor to makes the game advance with more accuracy and efficiency.

The following is a description of another exemplary embodiment. The hardware configuration of this exemplary embodiment is the same as the above described exemplary embodiment, and thus FIG. 1 to FIG. 3 will be used for this exemplary embodiment as well. This exemplary embodiment also deals with a wood-splitting game in which the playing manner and the game screens are the same as those in the aforesaid exemplary embodiment, and thus FIG. 4 to FIG. 7 will be utilized for a description of this exemplary embodiment as well. In the wood-splitting game of this exemplary embodiment, the cutting direction is decided on the basis of a valid DPD coordinate if it can be obtained or on the basis of the values output from the acceleration sensor 68 (the acceleration components in the three directions of X, Y and Z) if the valid DPD coordinate cannot be obtained. A difference of this exemplary embodiment from the above stated exemplary embodiment exists in the process of deciding the cutting direction from the values output from the acceleration sensor 68.

More specifically, in the previously described exemplary embodiment, in deciding the cutting direction from the values output from the acceleration sensor 68, only the X and Y components are recorded as a two-dimensional acceleration vector in the buffer, the movement direction vector and the gravity direction vector are calculated from the acceleration vectors stored in the buffer, and then the movement direction vector is subjected to a rotational arithmetic operation by which the gravity direction vector is directed vertically and downward in the X-Y space (that is, in the local coordinate system). With this, the swing direction in the stationary coordinate system (i.e., in the X0-Y0 space), that is, the cutting direction, is determined.

Meanwhile, in this exemplary embodiment, a three-dimensional acceleration vector having the values output from the acceleration sensor 68, i.e. the X, Y and Z components, is recorded in the buffer, and the acceleration vectors stored in the buffer are integrated to determine a total vector (that is, the gravity direction vector in the local coordinate system). Then, the acceleration vector is subjected to a rotational arithmetic operation so that the direction of the gravity vector (vertical and downward direction) in the stationary coordinate system is in the direction of the total vector, the gravity vector is subtracted from the acceleration vector after the rotation (that is, the acceleration vector in the stationary coordinate system), and then the X and Y components of the acceleration vector after the subtraction are taken as cutting direction.

Figure 20:
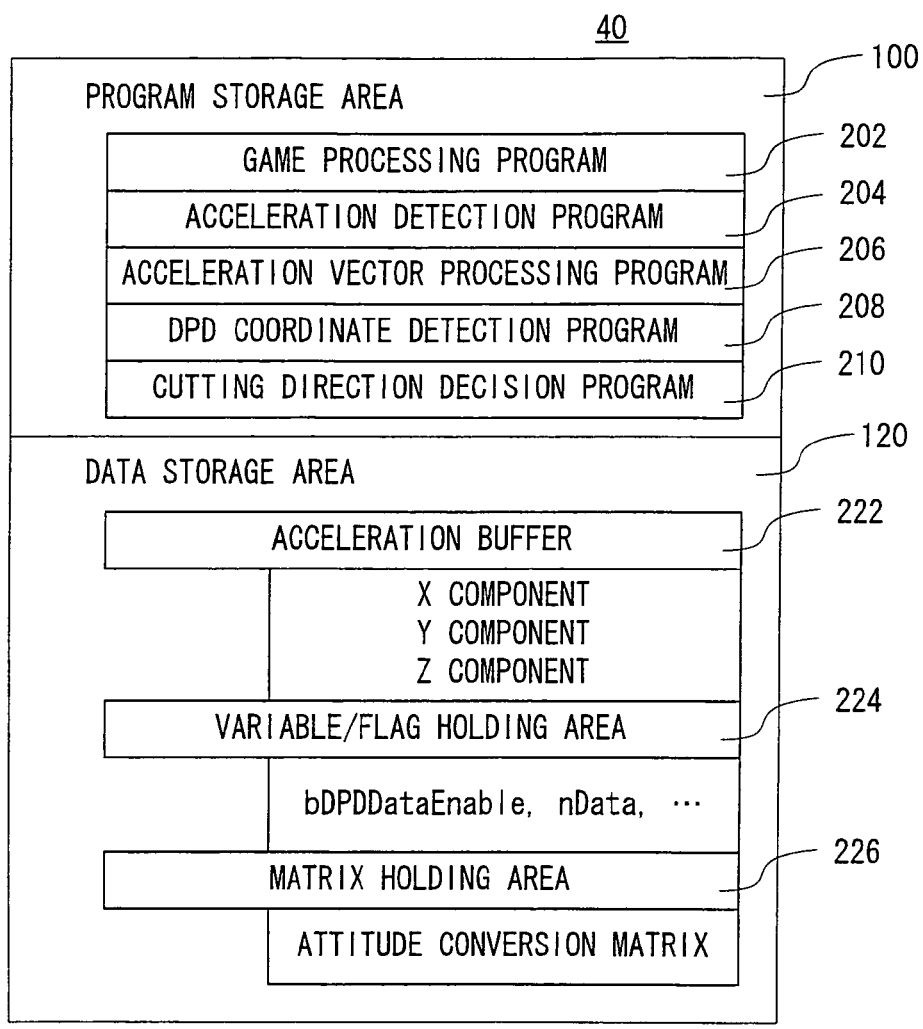
FIG. 20 is an illustrative view showing a memory map applied to another exemplary embodiment (second exemplary embodiment)

FIG. 20 shows a memory map of the main memory 40 in playing the wood-splitting game. Referring to FIG. 20, the program storage area 100 includes a game processing program 202, an acceleration detection program 204, an acceleration vector processing program 206, a DPD coordinate detection program 208, and a cutting direction decision program 210.

The game processing program 202 executes basic processes required for the progress of the wood-splitting game, as in the case with the game processing program 102 shown in FIG. 8. The acceleration detection program 204 detects the acceleration of the controller 26, as with the acceleration detection program 104 shown in FIG. 8. The acceleration vector processing program 206 executes a series of processes such as calculating the total vector from the acceleration vectors, rotating the acceleration vector, and subtracting the gravity vector from the rotated acceleration vector. The cutting direction decision program 210 decides the cutting direction based on either the acceleration vector that has undergone the above mentioned series of processes or the detected DPD coordinate.

The data storage area 120 has an acceleration buffer 222, a variable/flag holding area 224 and a matrix holding area 226, etc. The acceleration buffer 222 stores the accelerations of three components detected by the acceleration detection program 204. The variable/flag holding area 224 holds variables and flags referred to by the above mentioned programs (202 to 210). The matrix holding area 226 holds an attitude conversion matrix used in the rotation process by the acceleration vector program 206.

In deciding the cutting direction in the wood-splitting game, the CPU 36 executes a process according to the flow-charts shown in FIG. 21 to FIG. 24. Firstly, referring to FIG. 21, the CPU 36 sets "false" to bDPDDataEnable and "0" to nData in a step S101. In a step S103, the CPU 36 determines an attitude conversion matrix (described later).

In a step S105, the CPU 36 firstly obtains the accelerations from the controller 26, sets the obtained accelerations (X, Y and Z components) to acc1 (acc1.y, acc1.y and acc1.z), rotates acc1 in the attitude conversion matrix, and then sets a result of rotation to acc2. Next, the CPU 36 subtracts the gravity vector from acc2 and sets a result of subtraction to acc3. Then, the CPU 36 determines the magnitude of acc3 and sets a result of determination to size.

In a step S107, the CPU 36 determines whether nData is larger than "0" or not, and if NO, the CPU 36 goes to a step S131. If YES, the CPU 36 executes steps S109 to S123, and then goes to the step S131.

In the step S109, the CPU 36 determines whether an inner product between (m_acc.x, m_acc.y) and (acc3.x, acc3.y) is negative or not, that is, whether an angle formed by these two vectors is obtuse or not. In this case, m_acc.x and m_acc.y denotes acc.y and acc.y where the magnitude of acc is a maximum. In other words, the CPU 36 determines here whether a swing motion has been finished or not by detecting the reversed acceleration at the end of the swing motion.

If YES in the step S109, the CPU 36 determines in a step S125 whether nData is equal to or more than a constant A. If NO in the step S125, the CPU 36 moves to a step S123. If YES, the CPU 36 decides the cutting direction in a step S127 (described later), and provides a success representation in a step S129, and then returns to the step S101.

If NO in the step S109, the CPU 36 determines whether m_size is smaller than size or not. Here, m_size denotes the maximum value of size. If NO in the step S111, the CPU 36 goes to a step S115. If YES, the CPU 36 executes a step S113 and then goes to a step S115. In the step S113, the CPU 36 sets size to m_size, and then sets the magnitude of acc3 to size.

In the step S115, the CPU 36 increments nData, and determines in a succeeding step S117 whether nData is larger than a constant B (>constant A) or not. If YES, the CPU 36 moves to a step S127. If NO, the CPU 36 moves to a step S119. In the step S119, the CPU 36 obtains the past n acceleration vectors from the acceleration buffer 222, determines the magnitudes of the obtained n acceleration vectors, counts the number of acceleration vectors whose magnitudes are close to that of the gravity acceleration, and then sets a result of the counting to M. After the setting, the CPU 36 moves to a step S121.

In the step S121, the CPU 36 determines whether M is larger than a constant (e.g. "5") or not. If NO, the CPU 36 proceeds to a step S131. If YES, the CPU 36 executes a step S123 and then moves to a step S131. In the step S123, the CPU 36 sets "0" to nData. In other words, in the steps S121 and S123, the CPU 36 determines whether the currently being detected motion is wood splitting or not (that is, whether the player is swinging the controller 26 for wood splitting or not), and if this is not a wood-splitting motion (this is a mere rotational motion or the like), the CPU 36 resets nData.

Figure 22:
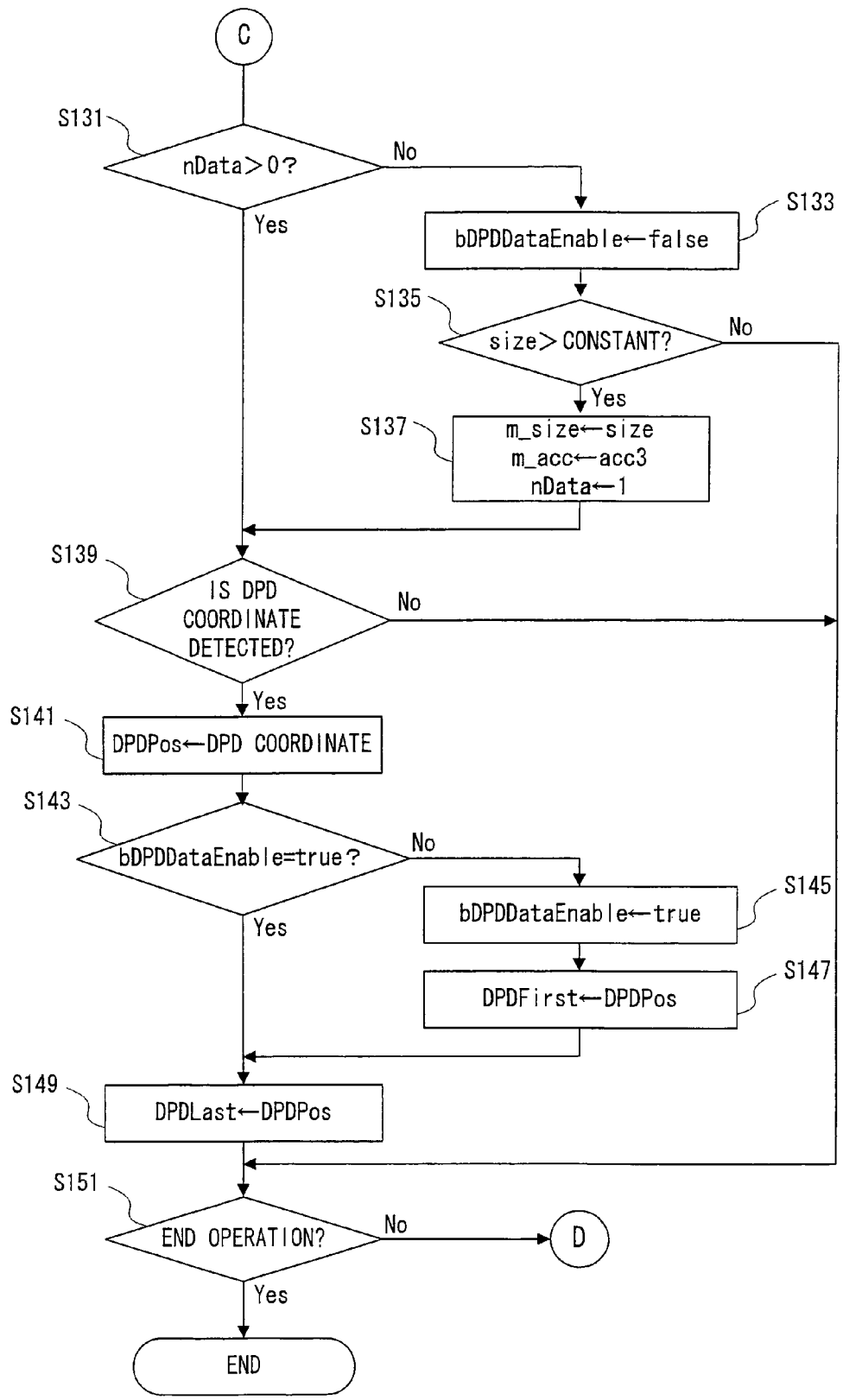
FIG. 22 is a flowchart showing another part of operation of the CPU applied to the other exemplary embodiment.

Referring to FIG. 22, in a step S131, the CPU 36 determines whether nData is larger than "0" or not. If YES, the CPU 36 goes to a step S139. If NO, the CPU 36 executes steps S133 to S137 and then goes to a step S139. In the step S133, the CPU 36 sets "false" to bDPDDataEnable. In the step S135, the CPU 36 determines whether size is larger than a constant or not, and if NO, the CPU 36 proceeds to a step S151. If YES in the step S135, the CPU 36 sets size to m_size, acc3 to m_acc, and "1" to nData in the step S137.

In the step S139, the CPU 36 determines whether a valid DPD coordinate has been obtained from the controller 26 or not. If NO, the CPU 36 goes to a step S151. If YES, the CPU 36 executes steps S141 to S149 and then goes to the step S151. In the step S141, the CPU 36 sets the obtained DPD coordinate to DPDPos. In the step S143, the CPU 36 determines whether bDPDDataEnable is "true" or not. If YES, the CPU 36 goes to the step S149. If NO, the CPU 36 executes the steps S145 to S147 and then goes to the step S149.

The CPU 36 sets "true" to bDPDDataEnable in the step S145 and sets DPDPos to DPDFirst in the step S147.

In the step S149, the CPU 36 sets DPDPos to DPDLast. Then, the CPU 36 determines in a step S151 whether an end operation has been performed or not, and if NO, the CPU 36 returns to the step S103. If YES, the CPU 36 ends the cutting direction decision process.

Figure 23:
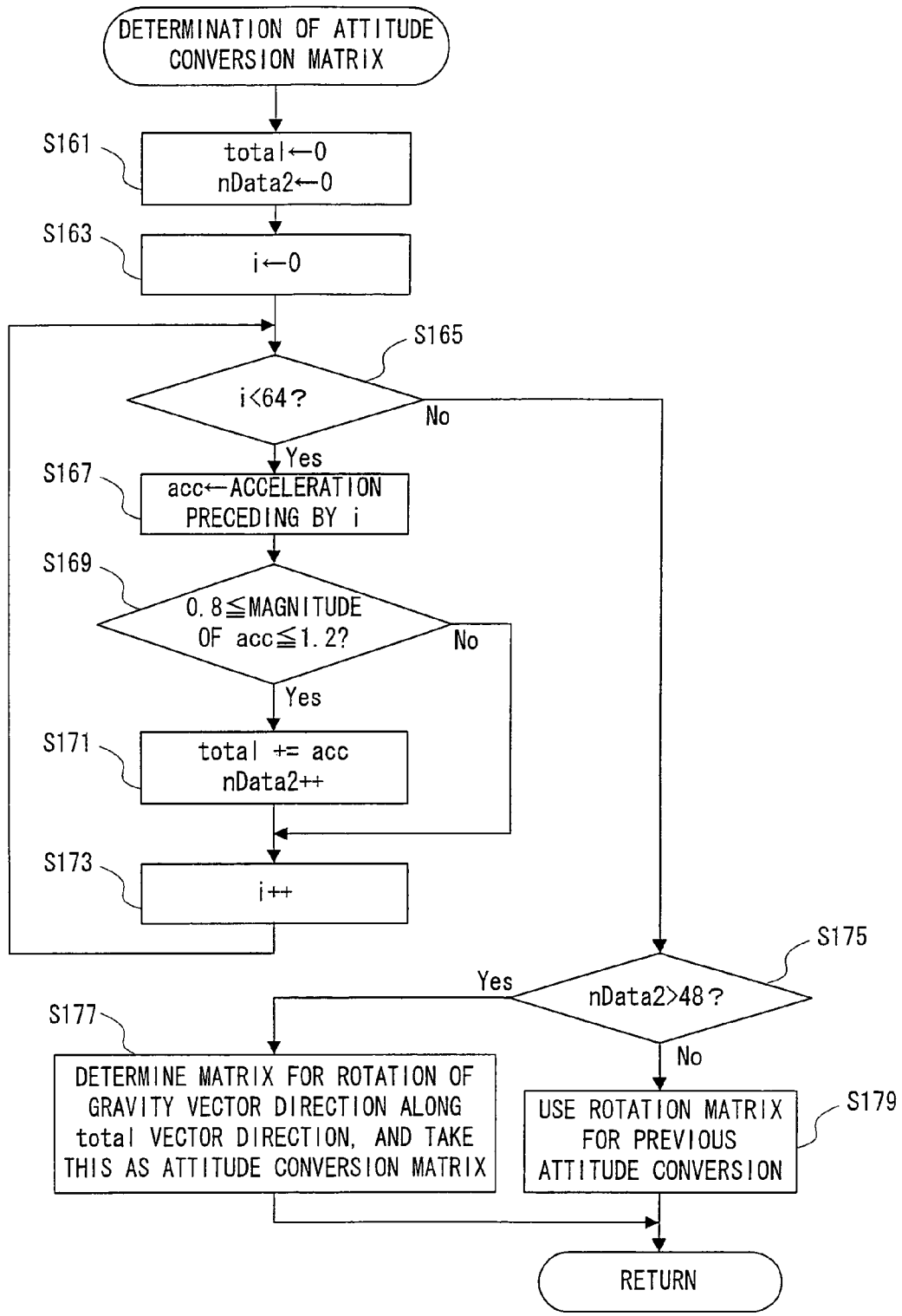
FIG. 23 is a flowchart showing still another part of operation of the CPU applied to the other exemplary embodiment.

The above mentioned process of step S103 for determining an attitude conversion matrix conforms to a subroutine shown in FIG. 23. Referring to FIG. 23, the CPU 36 sets "0" to total and nData2 in a step S161, sets "0" to i in a step S163, and then enters a loop process of steps S165 to S173. Besides, total is a vector obtained by totalizing some of the detected acceleration vectors that are close to the gravity acceleration, and nData2 is a variable indicating the number of some of the detected acceleration vectors that are close to the gravity acceleration.

In the step S165, the CPU 36 determines whether i is smaller than "64" or not. If YES in the step S165, the CPU 36 sets the acceleration vector preceding by i to acc in the step S167. In the step S169, the CPU 36 determines whether the magnitude of acc falls within a range of 0.8 to 1.2. If NO, the CPU 36 proceeds to a step S173. If YES, the CPU 36 executes a step S171 and then proceeds to the step S173. In the step S171, the CPU 36 adds acc to total, takes a result of addition as total, and then increments nData2. In the step S173, the CPU 36 increments i and then returns to the step S165.

When i has reached "64" by repeating such a series of processes, the CPU 36 makes a determination of NO in the step S165, exits from the loop, and then moves to a step S175. In the step S175, the CPU 36 determines whether nData2 is larger than 48 or not. That is, the CPU 36 determines whether 48 or more of the past 64 acceleration vectors have a magnitude of 0.8 to 1.2 or not. If YES, the CPU 36 determines a matrix for rotating the direction of the gravity vector in the stationary coordinate system along the direction of the total vector (or an equivalent arithmetic expression), and records it as an attitude conversion matrix in the matrix holding area 226. Then, the CPU 36 returns to the higher-level routine.

If NO in the step S175, the CPU 36 moves to a step S179 to decide that the previous attitude conversion matrix, that is, the attitude conversion matrix held in the matrix holding area 226, will be used in the rotational process of step S105. Then, the CPU 36 returns to the higher-level routine.

Figure 24:
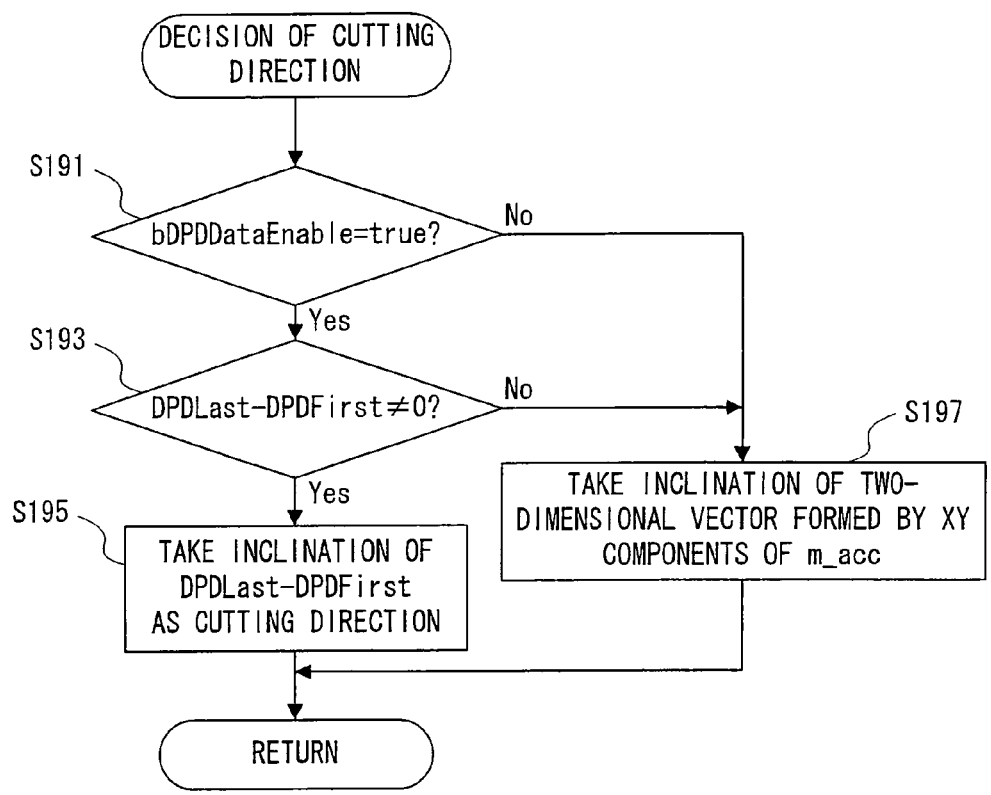
FIG. 24 is a flowchart showing further another part of operation of the CPU applied to the other exemplary embodiment.

The above mentioned cutting direction decision process of step S127 conforms to a subroutine shown in FIG. 24. Referring to FIG. 24, in a step S191, the CPU 36 determines whether bDPDDataEnable is "true" or not. If YES, the CPU 36 determines in a step S193 whether a difference between DPDLast and DPDFirst has a value other than "0" or not. If YES, the CPU 36 determines an inclination of {DPDLast-DPDFirst} and takes it as cutting direction. If NO in the steps S191 and S193, the CPU 36 moves to a step S197 to determine an inclination of the two-dimensional vector formed by X and Y components of m_acc and take it as cutting direction. After deciding the cutting direction, the CPU 36 returns to the higher-level routine.

As apparent from the above, this exemplary embodiment (second exemplary embodiment) makes it possible to carry out the game processing through the use of the movement direction of the pointing device (26) even if the position pointed to by the pointing device (26) cannot be identified, as in the case with the previously described exemplary embodiment.

In this exemplary embodiment, furthermore, the processor (36) calculates the gravity direction in the local coordinate system moving together with the pointing device by accumulatively totalizing the accelerations detected by the acceleration sensor (68) (S165 to S177). The processor (36) also calculates the direction of the acceleration in the stationary coordinate system by subjecting the acceleration detected by the acceleration sensor to a rotational process so that the gravity direction in the stationary coordinate system matches the calculated gravity direction (S105). This makes it possible to carry out the game processing accurately through the use of the acceleration direction in the stationary coordinate system, regardless of the attitude of the pointing device.

Moreover, in this exemplary embodiment, the above mentioned calculations are performed on the three acceleration components corresponding to the three directions of X, Y and Z, which makes it possible to reflect the calculated acceleration on the three-dimensional game screen and also perform the game accurately using the acceleration even on the two-dimensional game screen.

In each of the two above exemplary embodiments (first and second exemplary embodiments), although a predetermined position (more specifically, the center of the wood W: see FIG. 5 to FIG. 7) is taken as cutting central position, if two or more valid DPD coordinates are obtained, the first DPD coordinate may be taken as cutting start position and the last DPD coordinate as cut finish position. In the cases other than that (that is, if the cutting direction is to be decided on the basis of the values output from the acceleration sensor 68), a predetermined position becomes the cutting central position.

Figure 14:
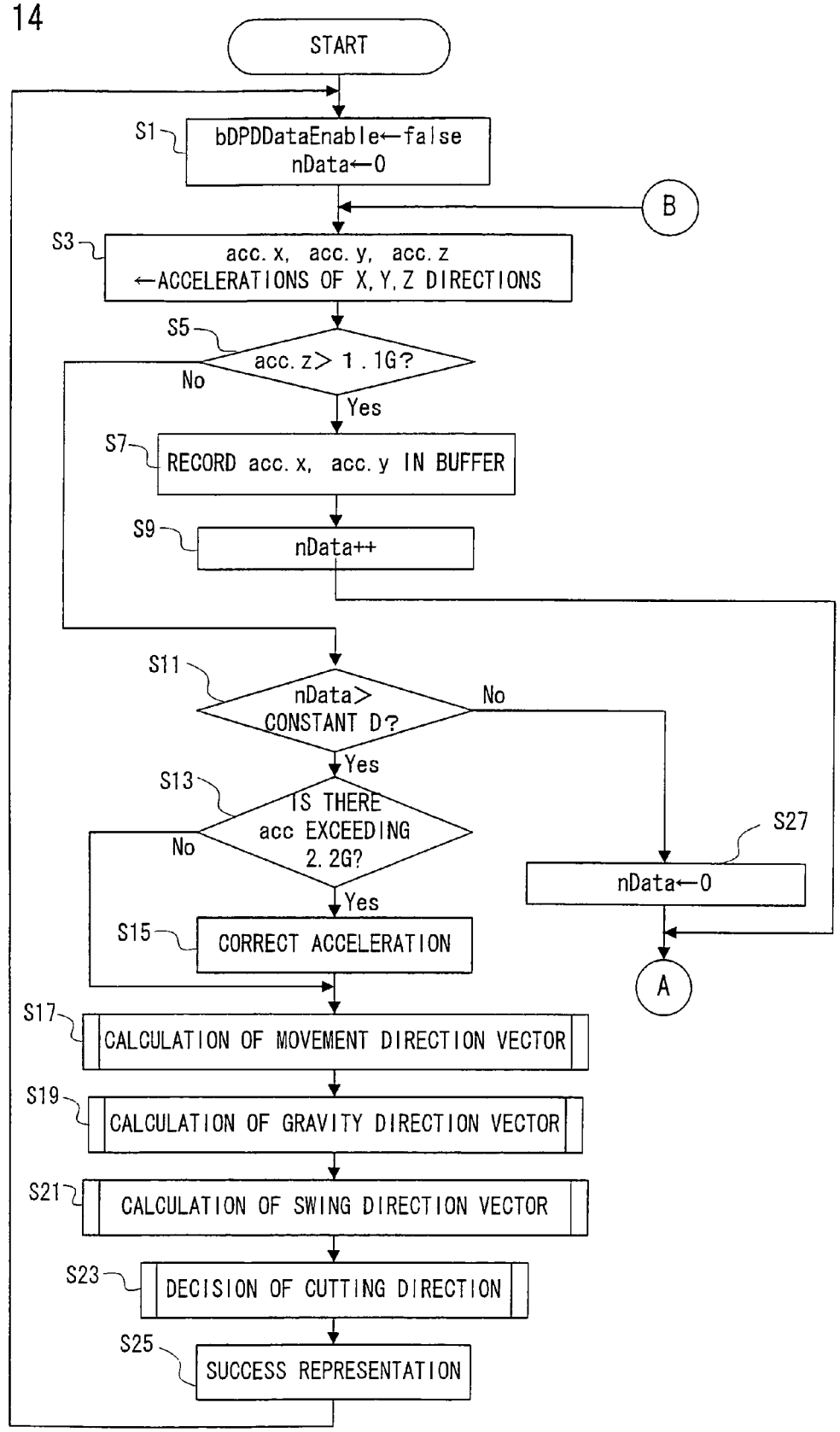
FIG. 14 is a flowchart showing a part of operation of a CPU applied to FIG. 1 exemplary embodiment.
Figure 25:
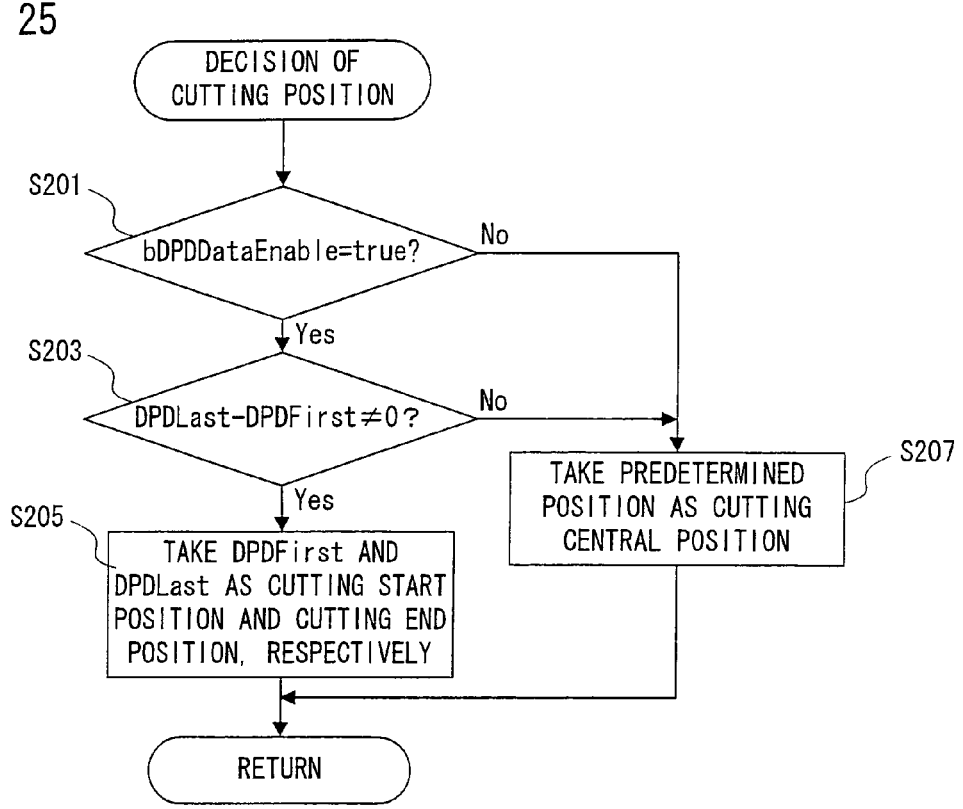
FIG. 25 is a flowchart showing a part of operation of the CPU applied to another exemplary embodiment (modification of the first exemplary embodiment)

Such a change can be added to the first exemplary embodiment as well by inserting the cut position decision step (S24) between the step S23 and the step S25 (see FIG. 14). The step S24 conforms to a subroutine described in FIG. 25. Referring to FIG. 25, if YES in both steps S201 and S203 that are equivalent to the steps S91 and S93 (see FIG. 19), DPDFirst and DPDLast are taken as cutting start position and cut finish position, respectively, in a step S205. If NO in the steps S201 and S203, a predetermined position is taken as cutting central position.

Figure 21:
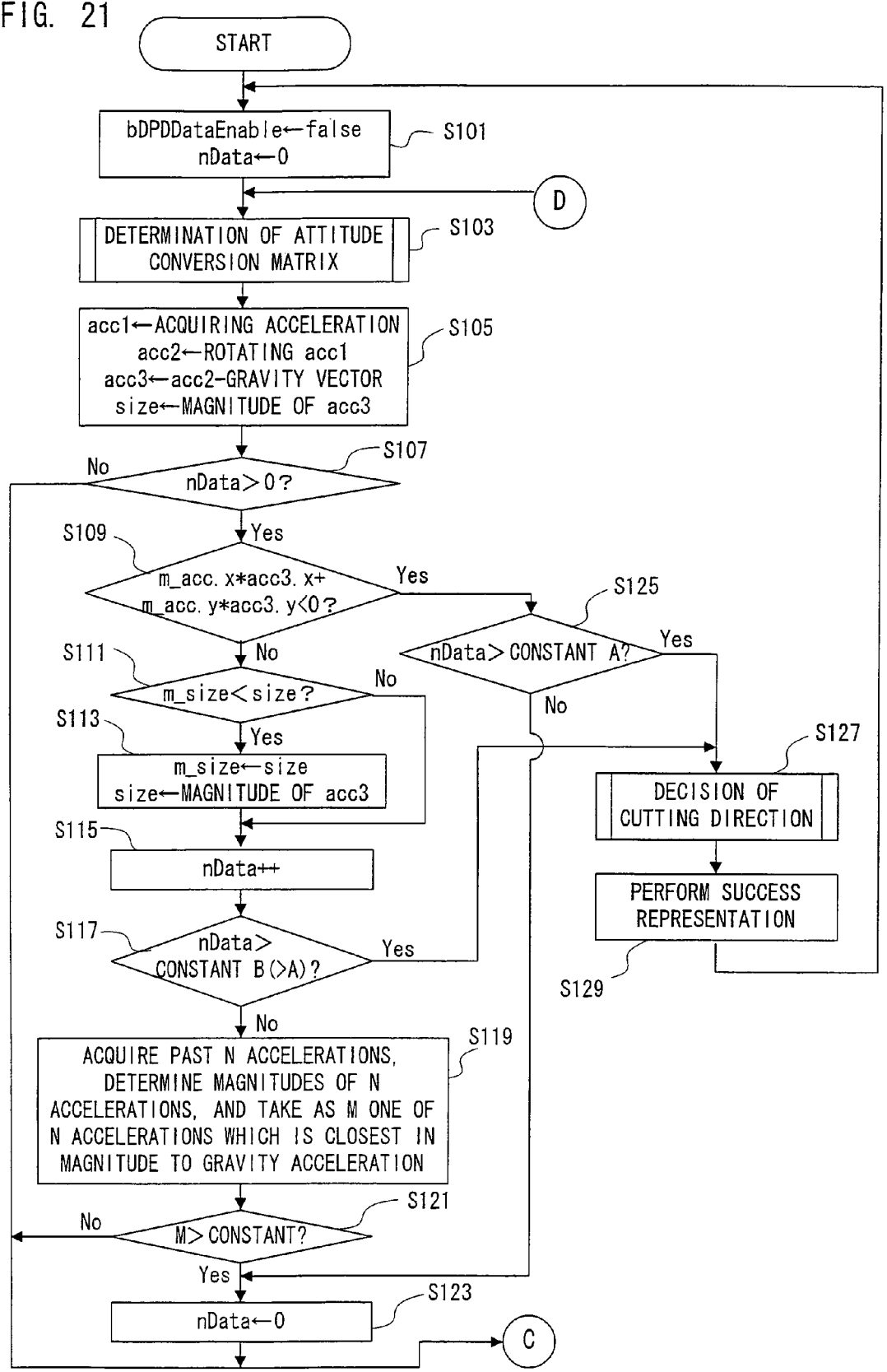
FIG. 21 is a flowchart showing a part of operation of a CPU applied to the other exemplary embodiment.
Figure 26:
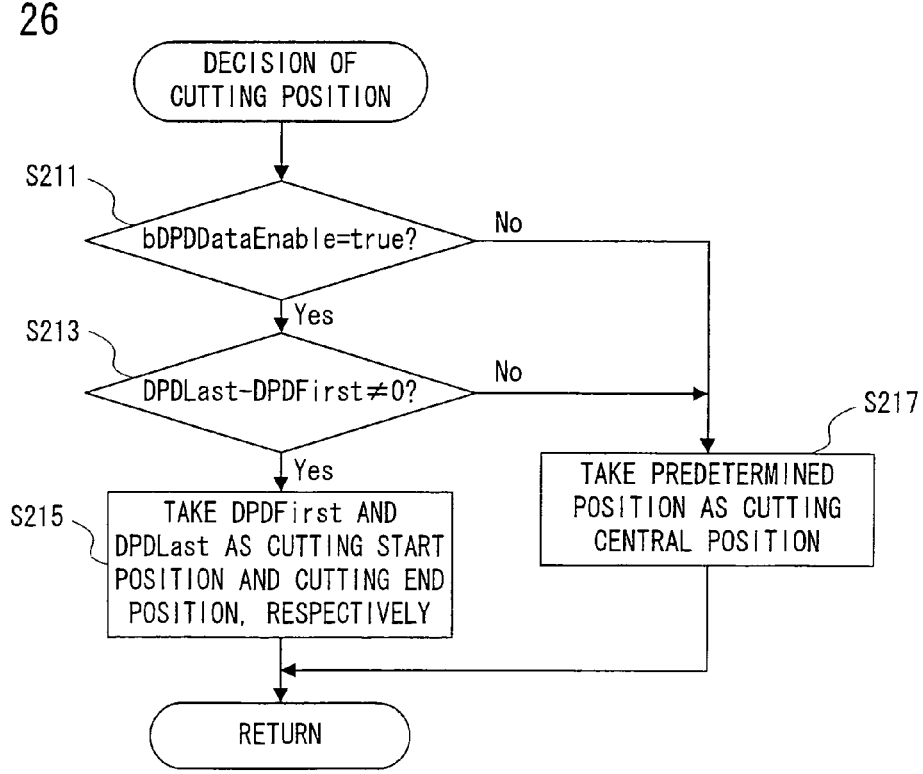
FIG. 26 is a flowchart showing a part of operation of the CPU applied to still another exemplary embodiment (modification of the second exemplary embodiment).

On the other hand, in the second exemplary embodiment, the cut position decision step (S128) is inserted between the step S127 and the step S129 (see FIG. 21). The step S128 is in conformity with a subroutine shown in FIG. 26. Referring to FIG. 26, if YES in both steps S211 and S213 equivalent to the steps S191 and S193 (see FIG. 24), DPDFirst and DPDLast are taken as cutting start position and cutting end position, respectively, in a step S215. If NO in the both steps S211 and S213, a predetermined position is taken as cutting central position in a step S217.

In the above described exemplary embodiments, the LED modules 24a and 24b are arranged in proximity to the screen of the display 34, and the imaging unit for imaging infrared rays emitted from the LED modules 24a and 24b is provided in the controller 26, so that the position of the controller 26 can be detected. However, the configuration of the certain exemplary embodiments is not limited to this. For example, the LED modules may be arranged in the controller 26 and the imaging unit may be set in proximity to the screen of the display 34. Alternatively, a light-receiving sensor or the like may be used instead of the imaging unit.

Further, although the above exemplary embodiments employ a pointing device equipped with the imaging unit for pointing at an arbitrary point on the screen, any other method can be used provided that it is capable of pointing at a point on the screen. For example, such a method can be employed by which an arbitrary point can be indicated by the position of the cursor on the screen that is moved through the manipulation of the cross key or the like in the controller 26. As an alternative, another pointing device such as a mouse for specifying a position coordinate on the screen can be used to designate an arbitrary point on the screen based on the value output from the mouse or the like. In this case, the acceleration sensor or the like for detecting the movement of a pen or mouse, etc. may be provided within the pen or mouse, etc.

Although the above descriptions are given in connection with the game system 10, the certain exemplary embodiments are also applicable to any system comprising a display device for displaying a game screen updated according to the progress of game processing, a pointing device for pointing to an arbitrary point on the game screen displayed by the display device, and an acceleration sensor provided in the pointing device.

Although the certain exemplary embodiments have been described and illustrated in detail, it is clearly understood that the same is by way of illustration and example only and is not to be taken by way of limitation, the spirit and scope of the exemplary embodiments being limited only by the terms of the appended claims.

What is claimed is:

1. A non-transitory computer-readable storage medium storing a computer game program, wherein
said game program causes a processor of a game system associated with a display device for displaying a game screen updated according to progress of game processing, a pointing device for pointing to an arbitrary point in the game screen displayed by said display device, and an acceleration sensor provided in said pointing device, to perform:
periodically identifying a position of the point pointed to by said pointing device;
detecting a change in the identified position;
determining a movement direction of said pointing device based on the acceleration detected by said acceleration sensor; and
executing said game processing based on a position change when the position change is detected, or executing said game processing based on the movement direction determined based on the acceleration detected by said acceleration sensor when information relating to position change information is not available.

2. A non-transitory computer-readable storage medium storing a computer game program according to claim 1, wherein
said game program allows said processor to further perform determining whether or not the acceleration detected by said acceleration sensor is equal to or more than a threshold value, and
position identification is carried out only for a time period during when it is determined that the acceleration is equal to or more than the threshold value.

3. A non-transitory computer-readable storage medium storing a computer game program according to claim 2, wherein
said game program controls said processor to further perform determining the movement direction of said pointing device, based on, out of a plurality of positions detected within said time period, a first detected position and a last detected position.

4. A non-transitory computer-readable storage medium storing a computer game program according to claim 3, wherein
determining the movement direction of said pointing device based on the acceleration detected by said acceleration sensor is carried out only for said time period.

5. A non-transitory computer-readable storage medium storing a computer game program according to claim 1, wherein
said game processing includes deciding a path in said game screen corresponding to the movement of said pointing device, and
when a position change is detected, said path is decided on the basis of a plurality of identified positions, and when no position change is detected, said path is decided on the basis of the movement direction determined based on the acceleration detected by the acceleration sensor and a preset position.

6. A non-transitory computer-readable storage medium storing a computer game program according to claim 1, wherein
said game program causes said processor to further perform:
calculating a speed direction of said pointing device in a local coordinate system moving together with the pointing device, by accumulatively adding a change in acceleration detected by said acceleration sensor;
calculating a gravity direction in said local coordinate system by accumulatively adding an acceleration detected by said acceleration sensor; and
calculating a speed direction in a stationary coordinate system by subjecting the speed direction calculated in said local coordinate system to a rotational operation so that the calculated gravity direction matches a gravity direction in said stationary coordinate system, and wherein
determination of said movement direction of said pointing device based on the acceleration detected by said acceleration sensor is made on the basis of a result of calculation when calculating said speed direction in a stationary coordinate system.

7. A non-transitory computer-readable storage medium storing a computer game program according to claim 6, wherein
said acceleration sensor detects acceleration components in three directions,
in each of said calculating a speed direction of said pointing device in a local coordinate system, calculating a gravity direction in said local coordinate system and calculating a speed direction in a stationary coordinate system, calculation is carried out on two acceleration components corresponding to any two of said three directions, and
in said acceleration determination, determination is carried out on the remaining one of said three directions.

8. A non-transitory computer-readable storage medium storing a computer game program according to claim 6, wherein
said acceleration sensor has a predetermined detectable range, and
said game program controls said processor to further perform a correction for, when the acceleration of said pointing device exceeds said detectable range, correcting the acceleration detected by said acceleration sensor.

9. A non-transitory computer-readable storage medium storing a computer game program according to claim 8, wherein
in said correction, correction is made using a Bazier curve defined by the acceleration detected by said acceleration sensor when the acceleration of said pointing device falls within said detectable range.

10. A non-transitory computer-readable storage medium recording a computer game program according to claim 1, wherein
said game program causes said processor to further perform:
calculating a gravity direction in a local coordinate system moving together with said pointing device by accumulatively adding an acceleration detected by said acceleration sensor; and
calculating a direction of acceleration in a stationary coordinate system by subjecting the acceleration detected by said acceleration sensor to a rotational process so that the gravity direction in the stationary coordinate system matches the gravity direction calculated in said gravity direction calculation, and wherein
determination of said movement direction of said pointing device based on the acceleration detected by said acceleration sensor is made on the basis of a result of calculation when calculating said speed direction in a stationary coordinate system.

11. A non-transitory computer-readable storage medium storing a computer game program according to claim 10, wherein
said acceleration sensor detects acceleration components in three directions, and
in each of said direction calculations and said acceleration calculation, calculation is carried out on three acceleration components corresponding to said three directions.

12. A non-transitory computer-readable storage medium storing a computer game program according to claim 1, wherein
said game system further comprises a plurality of light-emitting elements provided in proximity to a screen of said display device,
said optical pointing device includes an imaging unit for imaging an object scene containing said plurality of light-emitting elements, and
in said position identification, the position pointed to by said pointing device is identified on the basis of an image of the object scene imaged by said imaging unit.

13. A game system associated with a display device for displaying a game screen updated according to progress of a game, comprising:
a pointing device for pointing to an arbitrary point in the game screen displayed by said display device;
an acceleration sensor provided in said pointing device;
position identification circuitry for identifying a position of the point pointed to by said pointing device periodically;
a position change circuitry for detecting a change in the position identified by said position identification circuitry;
first direction determination circuitry for determining a movement direction of said pointing device, based on the acceleration detected by said acceleration sensor; and a game processor for executing said game processing based on a position change when the position change is detected by said position change circuitry, or executing said game processing based on the movement direction determined by said first direction determination circuitry when information relating to position change information is not available.

14. A game device associated with a display device for displaying a game screen updated according to progress of a game, comprising:
   a pointing device for pointing to an arbitrary point in the game screen displayed by said display device;
   an acceleration sensor provided in said pointing device;
   a processor; and
   a memory coupled to said processor, said memory storing instructions that, when executed by said processor, control said processor to:
   (a) identify a position of the point pointed to by said pointing device at intervals of unit of time,
   (b) detect a change in the identified position, and
   (c) determine a movement direction of said pointing device, based on the acceleration detected by said acceleration sensor, wherein
   said processor executes said game processing based on a position change when the position change is detected, or executes said game processing based on the determined movement direction when position change information is not available.

15. A method for updating a game screen displayed on a display device by a game device according to game processing, the game device including a pointing device for pointing to an arbitrary point in the game screen and an acceleration sensor provided in said pointing device, comprising:
   identifying a position of the point pointed to by said pointing device at intervals of unit of time;
   detecting a change in the position identified in said position identification;
   determining a movement direction of said pointing device, based on the acceleration detected by said acceleration sensor; and
   executing said game processing based on a position change when the position change is detected in said position change detection, or executing said game processing based on the movement direction determined in said first direction determination when position change information is not available.

16. A system comprising:
   a first sensing arrangement for outputting information associated with aspects of a position pointed to using a pointing device;
   a second sensing arrangement for outputting information associated with aspects of motion of the pointing device; and
   a processor configured to perform processing based on the first sensor output information if such information is available and to perform processing based on the second sensor output information if the first sensor output information is not available.

17. The system according to claim 16, wherein the first sensing arrangement comprises an optical sensing arrangement and the second sensing arrangement comprises an inertial sensing arrangement.

18. The system according to claim 17, wherein the inertial sensing arrangement comprises an accelerometer disposed in the pointing device.

19. The system according to claim 17, wherein the optical sensing arrangement comprises a marker and a camera.

20. The system according to claim 19, wherein the camera is disposed in the pointing device.

* * * * *